US012017430B2

(12) United States Patent
Davies et al.

(10) Patent No.: US 12,017,430 B2
(45) Date of Patent: Jun. 25, 2024

(54) APPARATUS, SYSTEM, AND METHOD FOR ERECTING BOXES

(71) Applicant: Packsize LLC, Salt Lake City, UT (US)

(72) Inventors: George Davies, Brigham City, UT (US); Clinton Engleman, Layton, UT (US); Brady Sjoblom, North Ogden, UT (US)

(73) Assignee: PACKSIZE LLC, Salt Lake City, UT (US)

( * ) Notice: Subject to any disclaimer, the term of this patent is extended or adjusted under 35 U.S.C. 154(b) by 204 days.

(21) Appl. No.: 17/505,449

(22) Filed: Oct. 19, 2021

(65) Prior Publication Data

US 2022/0032570 A1 Feb. 3, 2022

Related U.S. Application Data

(62) Division of application No. 16/224,708, filed on Dec. 18, 2018, now Pat. No. 11,173,685.

(Continued)

(51) Int. Cl.

*B31B 50/00* (2017.01)
*B31B 50/26* (2017.01)

(Continued)

(52) U.S. Cl.

CPC ............ *B31B 50/78* (2017.08); *B31B 50/006* (2017.08); *B31B 50/26* (2017.08); *B31B 50/80* (2017.08);

(Continued)

(58) Field of Classification Search

CPC ....... B31B 50/006; B31B 50/26; B31B 50/78; B31B 50/80; B31B 2110/70; B31B 2120/70; B31B 2120/302

See application file for complete search history.

(56) References Cited

U.S. PATENT DOCUMENTS

| | | | |
|---|---|---|---|
| 1,809,853 | A | 6/1931 | Knowlton |
| 2,077,428 | A | 4/1937 | Mabon |

(Continued)

FOREIGN PATENT DOCUMENTS

| | | | |
|---|---|---|---|
| CN | 2164350 | Y | 5/1994 |
| CN | 1191833 | A | 9/1998 |

(Continued)

OTHER PUBLICATIONS

Final Office Action received for U.S. Appl. No. 17/416,811, dated Dec. 7, 2022, 23 pages.

(Continued)

*Primary Examiner* — Thomas M Wittenschlaeger
*Assistant Examiner* — David G Shutty
(74) *Attorney, Agent, or Firm* — Quarles & Brady LLP

(57) ABSTRACT

A method for erecting a box includes positioning can unerected box in an automated erecting apparatus. The method further includes bending major and minor flaps on the unerected box relative to sides of the unerected box. The method further includes, while the major and minor flaps are bent relative to the sides of the unerected box, performing an automated opening operation on the unerected box, wherein the unerected box comprises a stacking fold.

20 Claims, 9 Drawing Sheets

Related U.S. Application Data

(60) Provisional application No. 62/607,796, filed on Dec. 19, 2017, provisional application No. 62/607,247, filed on Dec. 18, 2017.

(51) Int. Cl.
*B31B 50/78* (2017.01)
*B31B 50/80* (2017.01)
*B31B 110/35* (2017.01)
*B31B 120/30* (2017.01)
*B31B 120/70* (2017.01)

(52) U.S. Cl.
CPC ..... *B31B 2110/35* (2017.08); *B31B 2120/302* (2017.08); *B31B 2120/70* (2017.08)

(56) References Cited

U.S. PATENT DOCUMENTS 2,083,351 A 6/1937 Sidebotham
2,181,117 A 11/1939 Brenn
2,217,784 A 10/1940 Bennett et al.
2,256,082 A 9/1941 Feurt
2,353,419 A 7/1944 Smithson
2,449,663 A 9/1948 Marcalus
2,609,736 A 9/1952 Montgomery
2,631,509 A 3/1953 Whytlaw
2,679,195 A 5/1954 Whytlaw
2,699,711 A 1/1955 Mobley
2,798,582 A 7/1957 Monroe et al.
2,887,021 A 5/1959 Duffy et al.
2,904,789 A 9/1959 Arthur et al.
2,989,903 A 6/1961 Wilcox
3,057,267 A 10/1962 Johnson, Jr.
3,096,692 A 7/1963 Crathern et al.
3,105,419 A 10/1963 La Bombard
3,108,515 A 10/1963 Stohlquist
3,119,547 A 1/1964 Nute
3,153,991 A 10/1964 Goodrich
3,242,827 A 3/1966 Winters
3,285,145 A 11/1966 Lieberman
3,288,349 A 11/1966 Palmer et al.
3,299,611 A 1/1967 Hendrick et al.
3,303,759 A 2/1967 Burke
3,308,723 A 3/1967 Bergh, Jr.
3,326,096 A 6/1967 Mendoza
3,406,611 A 10/1968 Benjamin et al.
3,418,893 A 12/1968 Stohlquist et al.
3,451,318 A * 6/1969 Michel .................. B65B 43/265 493/309
3,469,508 A 9/1969 Heinz
3,476,023 A 11/1969 Fuller et al.
3,511,496 A 5/1970 Rudolf
3,566,755 A 3/1971 Smith et al.
3,584,434 A 6/1971 Ellis
3,611,884 A 10/1971 Hottendorf
3,618,479 A 11/1971 Shields
3,628,408 A 12/1971 Rod
3,646,418 A 2/1972 Sterns et al.
3,728,945 A 4/1973 Vuilleumier
3,743,154 A 7/1973 Brewitz
3,748,972 A * 7/1973 Barton .................. B31B 50/782 493/126
3,763,750 A * 10/1973 Reichert ............... B65B 43/265 493/313
3,776,109 A 12/1973 Clark et al.
3,803,798 A 4/1974 Clancy
3,804,514 A 4/1974 Jasinski
3,807,726 A 4/1974 Hope et al.
3,882,764 A 5/1975 Johnson
3,891,203 A 6/1975 Schiff
3,912,389 A 10/1975 Miyamoto
3,913,464 A 10/1975 Flaum
3,949,654 A 4/1976 Stehlin
4,033,217 A 7/1977 Flaum et al.
4,044,658 A 8/1977 Mitchard
4,052,048 A 10/1977 Shirasaka
4,056,025 A 11/1977 Rubel
4,094,451 A 6/1978 Wescoat
4,121,506 A 10/1978 Van Grouw
4,123,966 A 11/1978 Buschor
4,163,414 A 8/1979 Bachman et al.
4,164,171 A 8/1979 Gorshe et al.
4,173,106 A 11/1979 Garcia et al.
4,184,770 A 1/1980 Pinior
4,191,467 A 3/1980 Schieck
4,221,373 A 9/1980 Muller Hans
4,224,847 A 9/1980 Tokuno
4,261,239 A 4/1981 Toboshi et al.
4,264,200 A 4/1981 Tickner et al.
4,275,543 A 6/1981 Marchetti
4,295,841 A 10/1981 Ward, Jr.
4,320,960 A 3/1982 Ward et al.
4,351,461 A 9/1982 Carlsson
4,368,052 A 1/1983 Bitsky et al.
4,373,412 A 2/1983 Gerber et al.
4,375,970 A 3/1983 Murphy et al.
4,401,250 A 8/1983 Carlsson
4,414,789 A 11/1983 Pattarozzi
4,437,570 A 3/1984 Sorenson
4,449,349 A 5/1984 Roth
4,487,596 A 12/1984 Livens et al.
4,563,169 A 1/1986 Mrta et al.
4,578,054 A * 3/1986 Herrin ..................... B31B 50/00 493/131
D286,044 S 10/1986 Kando
4,623,072 A 11/1986 Lorenz
4,638,696 A 1/1987 Urwyler
4,662,150 A 5/1987 Johnson et al.
4,695,006 A 9/1987 Pool
4,714,946 A 12/1987 Bajgert et al.
4,743,131 A 5/1988 Atwell
4,749,295 A 6/1988 Bankier et al.
4,773,781 A 9/1988 Bankier
4,838,468 A 6/1989 Hakan
4,844,316 A 7/1989 Keeny
4,847,632 A 7/1989 Norris
4,854,929 A 8/1989 Szuba
4,878,521 A 11/1989 Fredrickson
4,887,412 A 12/1989 Takamura
4,923,188 A 5/1990 Neir
4,932,930 A 6/1990 Coalier et al.
4,979,932 A 12/1990 Burnside
5,005,816 A 4/1991 Stemmler et al.
5,030,192 A 7/1991 Sager
5,039,242 A 8/1991 Johnson
5,046,716 A 9/1991 Lippold
5,058,872 A 10/1991 Gladow
5,072,641 A 12/1991 Urban et al.
5,074,836 A 12/1991 Fechner et al.
5,081,487 A 1/1992 Hoyer et al.
5,090,281 A 2/1992 Paulson et al.
5,094,660 A 3/1992 Okuzawa
5,105,600 A 4/1992 Depoint et al.
5,106,359 A 4/1992 Lott
5,111,252 A 5/1992 Hamada et al.
5,118,093 A 6/1992 Makiura et al.
5,120,279 A 6/1992 Rabe
5,120,292 A 6/1992 Ueda et al.
5,120,297 A 6/1992 Adami
5,123,890 A 6/1992 Green, Jr.
5,123,894 A 6/1992 Bergeman et al.
5,137,172 A 8/1992 Wagner et al.
5,137,174 A 8/1992 Bell
5,197,366 A 3/1993 Paulson et al.
5,240,243 A 8/1993 Gompertz et al.
5,241,353 A 8/1993 Maeshima et al.
5,263,785 A 11/1993 Negoro et al.
D344,751 S 3/1994 Keong
5,305,993 A 4/1994 Staeb
5,321,464 A 6/1994 Jessen et al.
5,335,777 A 8/1994 Murphy et al.
5,352,178 A 10/1994 Pazdernik
5,358,345 A 10/1994 Damitio

(56) References Cited

U.S. PATENT DOCUMENTS 5,369,939 A 12/1994 Moen et al.
5,375,390 A 12/1994 Frigo et al.
5,393,291 A 2/1995 Wingerter
5,411,252 A 5/1995 Lowell
5,584,633 A 12/1996 Scharer
5,586,758 A 12/1996 Kimura et al.
5,624,369 A 4/1997 Bidlack et al.
5,671,593 A 9/1997 Ginestra et al.
5,716,313 A 2/1998 Sigrist et al.
5,727,725 A 3/1998 Paskvich
5,767,975 A 6/1998 Ahlen
5,836,498 A 11/1998 Turek
5,902,223 A 5/1999 Simmons
5,927,702 A 7/1999 Ishii et al.
5,941,451 A 8/1999 Dexter
5,964,686 A 10/1999 Bidlack et al.
6,000,525 A 12/1999 Frulio
6,071,223 A 6/2000 Reider et al.
6,164,045 A 12/2000 Focke et al.
6,189,933 B1 2/2001 Felderman
6,321,650 B1 11/2001 Ogawa et al.
6,397,557 B1 6/2002 Bassissi et al.
6,428,000 B1 8/2002 Hara et al.
6,471,154 B2 10/2002 Toth
6,553,207 B2 4/2003 Tsusaka et al.
6,568,865 B1 5/2003 Fujioka et al.
6,673,001 B2 1/2004 Toth
6,690,476 B1 2/2004 Hren
6,830,328 B2 12/2004 Cuyler, Jr.
6,837,135 B2 1/2005 Michalski
6,840,898 B2 1/2005 Pettersson
6,910,997 B1 6/2005 Yampolsky et al.
6,913,568 B2 7/2005 Frank et al.
6,968,859 B1 11/2005 Nagano et al.
7,100,811 B2 9/2006 Pettersson et al.
7,115,086 B1 10/2006 Campbell, Jr.
7,121,543 B2 10/2006 Fujioka
7,201,089 B2 4/2007 Richter
7,237,969 B2 7/2007 Bartman
7,390,291 B2 6/2008 Chiu Chen
7,537,557 B2 5/2009 Holler
7,637,857 B2 12/2009 Coullery et al.
7,641,190 B2 1/2010 Hara et al.
7,647,752 B2 1/2010 Magnell
7,648,451 B2 1/2010 Calugi
7,648,596 B2 1/2010 Sharpe et al.
7,690,099 B2 4/2010 Bapst et al.
7,997,578 B2 8/2011 Saito et al.
8,277,367 B2 10/2012 Jannin et al.
D703,246 S 4/2014 Pettersson et al.
8,999,108 B2 4/2015 Nagao et al.
9,069,151 B2 6/2015 Conner
9,120,284 B2 9/2015 Capoia
9,199,794 B2 12/2015 Nadachi et al.
9,227,373 B2 1/2016 Pettersson et al.
9,329,565 B2 5/2016 Osaki
9,352,526 B2 5/2016 Pettersson
9,924,502 B2 3/2018 Choi et al.
9,969,142 B2 5/2018 Pettersson et al.
10,093,438 B2 10/2018 Pettersson
10,286,621 B2 5/2019 Toro
2002/0017754 A1 2/2002 Kang
2002/0066683 A1 6/2002 Sanders
2002/0091050 A1 7/2002 Bacciottini et al.
2002/0115548 A1 8/2002 Lin et al.
2002/0125712 A1 9/2002 Felderman
2002/0139890 A1 10/2002 Toth
2003/0102244 A1 6/2003 Sanders
2003/0217628 A1 11/2003 Michalski
2004/0060264 A1 4/2004 Miller
2004/0082453 A1 4/2004 Pettersson
2004/0092374 A1 5/2004 Cheng
2004/0144555 A1 7/2004 Buekers et al.
2004/0198577 A1 10/2004 Blumle
2004/0261365 A1 12/2004 White
2005/0079965 A1 4/2005 Moshier et al.
2005/0103923 A1 5/2005 Pettersson et al.
2005/0215409 A1 9/2005 Abramson et al.
2005/0280202 A1 12/2005 Vila et al.
2006/0100079 A1 5/2006 Graham et al.
2006/0178248 A1 8/2006 Coullery et al.
2006/0180438 A1 8/2006 Mosli et al.
2006/0180991 A1 8/2006 Nakahata et al.
2006/0181008 A1 8/2006 Van et al.
2007/0079575 A1 4/2007 Monti
2007/0228119 A1 10/2007 Barner
2007/0287623 A1 12/2007 Carlson et al.
2007/0289253 A1 12/2007 Miller
2008/0020916 A1 1/2008 Magnell
2008/0037273 A1 2/2008 Muehlemann et al.
2008/0066632 A1 3/2008 Raueiser
2008/0115641 A1 5/2008 Freyburger et al.
2008/0148917 A1 6/2008 Pettersson
2008/0300120 A1 12/2008 Sato
2009/0062098 A1 3/2009 Inoue et al.
2009/0178528 A1 7/2009 Adami
2009/0199527 A1 8/2009 Wehr et al.
2009/0264271 A1 10/2009 Wiklund
2010/0041534 A1 2/2010 Harding et al.
2010/0111584 A1 5/2010 Shiohara et al.
2010/0206582 A1 8/2010 Meyyappan et al.
2010/0210439 A1 8/2010 Goto
2010/0263333 A1 10/2010 Langen
2011/0026999 A1 2/2011 Kohira
2011/0092351 A1 4/2011 Hatano et al.
2011/0099782 A1 5/2011 Schonberger et al.
2011/0110749 A1 5/2011 Carter et al.
2011/0171002 A1 7/2011 Pettersson
2011/0229191 A1 9/2011 Nomi
2011/0230325 A1 9/2011 Harding et al.
2011/0319242 A1 12/2011 Pettersson
2012/0021884 A1 1/2012 Musha
2012/0028776 A1 2/2012 Pettersson et al.
2012/0100976 A1 4/2012 Graham et al.
2012/0106963 A1 5/2012 Huang et al.
2012/0122640 A1 5/2012 Pazdernik et al.
2012/0122646 A1 5/2012 Murano
2012/0129670 A1 5/2012 Pettersson et al.
2012/0131888 A1 5/2012 Pettersson et al.
2012/0139670 A1 6/2012 Yamagata et al.
2012/0142512 A1 6/2012 Keller
2012/0242512 A1 9/2012 Horstemeyer
2012/0319920 A1 12/2012 Athley et al.
2012/0328253 A1 12/2012 Hurley et al.
2013/0000252 A1 1/2013 Pettersson et al.
2013/0045847 A1 2/2013 Capoia
2013/0104718 A1 5/2013 Tai
2013/0108227 A1 5/2013 Conner
2013/0130877 A1 5/2013 Su
2013/0146355 A1 6/2013 Strasser et al.
2013/0210597 A1 8/2013 Pettersson
2013/0294735 A1 11/2013 Burris et al.
2013/0333538 A1 12/2013 Long et al.
2014/0078635 A1 3/2014 Conner et al.
2014/0091511 A1 4/2014 Martin
2014/0101929 A1 4/2014 Kim et al.
2014/0140671 A1 5/2014 Islam
2014/0315701 A1 10/2014 Pettersson
2014/0336026 A1 11/2014 Pettersson
2014/0357463 A1 12/2014 Kojima
2015/0018189 A1 1/2015 Pettersson et al.
2015/0019387 A1 1/2015 Pettersson et al.
2015/0053349 A1 2/2015 Mori et al.
2015/0055926 A1 2/2015 Strasser et al.
2015/0103923 A1 4/2015 Ramasubramonian et al.
2015/0143777 A1 5/2015 Rapp et al.
2015/0148210 A1 5/2015 Sibthorpe
2015/0155697 A1 6/2015 Loveless et al.
2015/0224731 A1 8/2015 Ponti
2015/0273897 A1 10/2015 Kato et al.
2015/0355429 A1 12/2015 Villegas et al.
2015/0360433 A1 12/2015 Feijen et al.
2015/0360801 A1 12/2015 Sytema
2016/0001441 A1 1/2016 Osterhout et al.

(56) References Cited

U.S. PATENT DOCUMENTS

| | | | |
|---|---|---|---|
| 2016/0049782 | A1 | 2/2016 | Strasser et al. |
| 2016/0122044 | A1 | 5/2016 | Evers et al. |
| 2016/0184142 | A1 | 6/2016 | Vanvalkenburgh et al. |
| 2016/0185475 | A1 | 6/2016 | Pettersson |
| 2016/0241468 | A1 | 8/2016 | Sabella et al. |
| 2016/0340067 | A1 | 11/2016 | Winkler et al. |
| 2017/0080666 | A1 | 3/2017 | Graham et al. |
| 2017/0355166 | A1 | 12/2017 | Jonker |
| 2017/0361560 | A1 | 12/2017 | Osterhout |
| 2018/0178476 | A1 | 6/2018 | Pettersson et al. |
| 2018/0201465 | A1 | 7/2018 | Osterhout |
| 2018/0265228 | A1 | 9/2018 | Hagestedt et al. |
| 2019/0002137 | A1 | 1/2019 | Pettersson |
| 2019/0184670 | A1 | 6/2019 | Davies et al. |
| 2019/0308383 | A1 | 10/2019 | Provoost et al. |
| 2019/0308761 | A1 | 10/2019 | Provoost et al. |
| 2019/0329513 | A1 | 10/2019 | Pettersson et al. |
| 2019/0389611 | A1 | 12/2019 | Pettersson |
| 2021/0001583 | A1 | 1/2021 | Osterhout |
| 2021/0283878 | A1 | 9/2021 | Pettersson et al. |
| 2022/0080691 | A1 | 3/2022 | Osterhout et al. |
| 2022/0144469 | A1 | 5/2022 | Pettersson |
| 2023/0348126 | A1 | 11/2023 | Niklas |

FOREIGN PATENT DOCUMENTS

| | | | | |
|---|---|---|---|---|
| CN | 1366487 | A | 8/2002 | |
| CN | 1876361 | A | 12/2006 | |
| CN | 102371705 | A | 3/2012 | |
| CN | 202412794 | U | 9/2012 | |
| CN | 102753442 | A | 10/2012 | |
| CN | 102941592 | A | 2/2013 | |
| CN | 104169073 | A | 11/2014 | |
| CN | 104185538 | A | 12/2014 | |
| CN | 104718067 | A | 6/2015 | |
| CN | 104812560 | A | 7/2015 | |
| CN | 204773785 | U | 11/2015 | |
| CN | 106079570 | A | 11/2016 | |
| DE | 1082227 | B | 5/1960 | |
| DE | 1212854 | B | 3/1966 | |
| DE | 2700004 | A1 | 7/1978 | |
| DE | 3343523 | A1 | 6/1985 | |
| DE | 3825506 | A1 | 2/1990 | |
| DE | 19541061 | C1 | 11/1996 | |
| DE | 10355544 | A1 | 6/2005 | |
| DE | 102005063193 | A1 | 7/2007 | |
| DE | 102008035278 | A1 | 2/2010 | |
| EA | 013852 | B1 | 8/2010 | |
| EP | 0030366 | A1 | 6/1981 | |
| EP | 0202998 | A1 | 11/1986 | |
| EP | 0234228 | A2 | 9/1987 | |
| EP | 0359005 | A1 | 3/1990 | |
| EP | 0650827 | A2 | 5/1995 | |
| EP | 0889779 | A2 | 1/1999 | |
| EP | 0903219 | A2 | 3/1999 | |
| EP | 1065162 | A2 | 1/2001 | |
| EP | 1223107 | A1 | 7/2002 | |
| EP | 1373112 | A1 | 1/2004 | |
| EP | 1428759 | A2 | 6/2004 | |
| EP | 1997736 | A2 | 12/2008 | |
| EP | 1497049 | B1 | 3/2010 | |
| EP | 2228206 | A1 | 9/2010 | |
| EP | 2377764 | A1 | 10/2011 | |
| EP | 3231594 | A1 | 10/2017 | |
| FR | 0428967 | A | 9/1911 | |
| FR | 1020458 | A | 2/1953 | |
| FR | 1592372 | A | 5/1970 | |
| FR | 2721301 | A1 | 12/1995 | |
| FR | 2770445 | A1 | 5/1999 | |
| FR | 2770455 | A1 | 5/1999 | |
| FR | 2808722 | A1 | 11/2001 | |
| FR | 2814393 | A1 | 3/2002 | |
| FR | 2976561 | A1 | 12/2012 | |
| GB | 0166622 | | 7/1921 | |
| GB | 0983946 | A | 2/1965 | |
| GB | 1169382 | A | * 10/1966 | ............ B65B 43/28 |
| GB | 1362060 | A | 7/1974 | |
| GB | 1546789 | A | 5/1979 | |
| JP | 49-099239 | A | 9/1974 | |
| JP | 50-078616 | A | 6/1975 | |
| JP | 51-027619 | A | 3/1976 | |
| JP | 55-057984 | A | 4/1980 | |
| JP | 56-089937 | A | 7/1981 | |
| JP | 59-031140 | A | 2/1984 | |
| JP | 59-176836 | A | 10/1984 | |
| JP | 61-118720 | A | 6/1986 | |
| JP | 61-242837 | A | 10/1986 | |
| JP | 01-133164 | A | 5/1989 | |
| JP | 02-182443 | A | 7/1990 | |
| JP | 03-070927 | A | 3/1991 | |
| JP | 06-099526 | A | 4/1994 | |
| JP | 06-320648 | A | 11/1994 | |
| JP | 07-156305 | A | 6/1995 | |
| JP | 08-238690 | A | 9/1996 | |
| JP | 08-333036 | A | 12/1996 | |
| JP | 2000-323324 | A | 11/2000 | |
| JP | 2003-079446 | A | 3/2003 | |
| JP | 2003-165167 | A | 6/2003 | |
| JP | 2005-067019 | A | 3/2005 | |
| JP | 2005-219798 | A | 8/2005 | |
| JP | 2006-289914 | A | 10/2006 | |
| JP | 2007-185799 | A | 7/2007 | |
| JP | 2008-254789 | A | 10/2008 | |
| JP | 2009-023074 | A | 2/2009 | |
| JP | 2009-132049 | A | 6/2009 | |
| JP | 2011-520674 | A | 7/2011 | |
| JP | 2011-230385 | A | 11/2011 | |
| JP | 2015-160428 | A | 9/2015 | |
| NO | 99/17923 | A1 | 4/1999 | |
| RU | 2015030 | C1 | 6/1994 | |
| RU | 2037425 | C1 | 6/1995 | |
| RU | 2089398 | C1 | 9/1997 | |
| RU | 2136503 | C1 | 9/1999 | |
| RU | 2180646 | C1 | 3/2002 | |
| RU | 2004136918 | A | 5/2006 | |
| RU | 2287432 | C2 | 11/2006 | |
| RU | 2398674 | C1 | 9/2010 | |
| RU | 2531785 | C2 | 10/2014 | |
| RU | 2600917 | C2 | 10/2016 | |
| SE | 0450829 | B | 8/1987 | |
| SE | 450829 | B | 8/1987 | |
| SE | 541921 | C2 | 1/2020 | |
| SE | 1851054 | A1 | 3/2020 | |
| SE | 2050379 | A1 | 3/2020 | |
| SE | 543046 | C2 | 9/2020 | |
| SU | 1054863 | A1 | 11/1983 | |
| SU | 1121156 | A1 | 10/1984 | |
| SU | 1718783 | A1 | 3/1992 | |
| SU | 1756211 | A1 | 8/1992 | |
| WO | 96/14773 | A1 | 5/1996 | |
| WO | 97/31773 | A2 | 9/1997 | |
| WO | 02/79062 | A1 | 10/2002 | |
| WO | 03/89163 | A2 | 10/2003 | |
| WO | 2009/093936 | A1 | 7/2009 | |
| WO | 2010/091043 | A1 | 8/2010 | |
| WO | 2011/007237 | A1 | 1/2011 | |
| WO | 2011/100078 | A2 | 8/2011 | |
| WO | 2011/135433 | A1 | 11/2011 | |
| WO | 2012/003167 | A1 | 1/2012 | |
| WO | 2013/071073 | A1 | 5/2013 | |
| WO | 2013/071080 | A1 | 5/2013 | |
| WO | 2013/106180 | A1 | 7/2013 | |
| WO | 2013/114057 | A2 | 8/2013 | |
| WO | 2014/048934 | A1 | 4/2014 | |
| WO | 2014/117816 | A1 | 8/2014 | |
| WO | 2014/117817 | A1 | 8/2014 | |
| WO | 2015/173744 | A1 | 11/2015 | |
| WO | 2016/176271 | A1 | 11/2016 | |
| WO | 2017/203401 | A1 | 11/2017 | |

(56) References Cited

FOREIGN PATENT DOCUMENTS

WO 2017/218296 A1 12/2017
WO 2017/218297 A1 12/2017

OTHER PUBLICATIONS

Non-Final Office Action received for U.S. Appl. No. 17/264,808, dated Sep. 8, 2022, 8 pages.
Non-Final Office Action received for U.S. Appl. No. 17/586,517, dated Jan. 20, 2023, 14 pages.
CN Office Action dated Jan. 15, 2021 for CN Application No. 201880016638.
Final Office Action received for U.S. Appl. No. 13/147,787, dated Apr. 17, 2015.
Final Office Action received for U.S. Appl. No. 13/147,787, dated Feb. 16, 2016.
Final Office Action received for U.S. Appl. No. 13/147,787, dated Mar. 7, 2017.
Final Office Action received for U.S. Appl. No. 14/357,183, dated Nov. 12, 2015.
Final Office Action received for U.S. Appl. No. 14/357,190, dated Aug. 1, 2017.
Final Office Action received for U.S. Appl. No. 14/370,729, dated Jul. 12, 2017.
Final Office Action received for U.S. Appl. No. 15/872,770, dated Sep. 16, 2020, 17 pages.
Final Office Action received for U.S. Appl. No. 16/224,708, dated May 5, 2021, 24 pages.
Final Rejection dated May 5, 2021 for U.S. Appl. No. 16/224,708.
International Search Report and Wirtten Opinion for application No. PCT/US2012/070719 dated Feb. 25, 2013.
International Search Report and Written Opinion for application No. PCT/US2017/036603 dated Oct. 18, 2017.
International Search Report and Written Opinion for application No. PCT/US2017/036606 dated Oct. 24, 2017.
International Search Report and Written Opinion for PCT/US18/14275 dated Apr. 4, 2018.
International Search Report and Written Opinion for PCT/US19/62696 dated Feb. 4, 2020.
International Search Report and Written Opinion for PCT/US2015/67375 dated Mar. 11, 2016.
International Search Report and Written Opinion for PCT/US2019/049102 dated Dec. 2, 2019.
International Search Report and Written Opinion from International Application No. PCT/US2010/022983 dated Apr. 13, 2010.
International Search Report and Written Opinion issued in PCT/US2019/038142 dated Aug. 19, 2019.
International Search Report and Written Opinion PCT/IB2019/052793 dated Nov. 11, 2019.
International Search Report and Written Opinion PCT/IB2019/052794 dated Jun. 19, 2019.
International Search Report and Written Opinion received for PCT Patent Application No. PCT/US2018/020928, dated Jun. 7, 2018, 9 pages.
International Search Report and Written Opinion received for PCT Patent Application No. PCT/US2019/049535, dated Jun. 9, 2020, 14 pages.
International Search Report and Written Opinion received for PCT Patent Application No. PCT/US2020/012519, dated Jun. 26, 2020, 19 pages.
International Search Report and Written Opinion received for PCT Patent Application No. PCT/US2020/012519, dated Jun. 26, 2020, 20 pages.
International Search Report and Written Opinion, PCT/US2012/064403, US Search Authority, Completed Mar. 26, 2013, dated Apr. 8, 2013.
International Search Report and Written Opinion, PCT/US2012/064414, US Search Authority, Completed Jan. 4, 2013, dated Jan. 25, 2013.
International Search Report for PCT/US2011/042096 dated Oct. 28, 2011.
JP Office Action dated Jan. 7, 2022 for JP Application No. 2019548058.
List of references dated Aug. 5, 2021 for U.S. Appl. No. 16/491,088.
List of references dated Jan. 15, 2021 for U.S. Appl. No. 16/224,708.
List of references dated Jun. 7, 2021 for U.S. Appl. No. 16/491,088.
List of references dated May 5, 2021 for U.S. Appl. No. 16/224,708.
Non-Final Office Action received for U.S. Appl. No. 15/872,770, dated Nov. 10, 2020, 24 pages.
Non-Final Office Action received for U.S. Appl. No. 16/224,708, dated Jan. 15, 2021, 19 pages.
Non-Final Office Action received for U.S. Appl. No. 16/310,406, dated Aug. 19, 2020, 22 pages.
Non-Final Office Action received for U.S. Appl. No. 16/491,088, dated Aug. 5, 2021, 11 pages.
Non-Final Office Action received for U.S. Appl. No. 17/416,811, dated Apr. 27, 2022, 9 pages.
Non-Final Rejection dated Aug. 5, 2021 for U.S. Appl. No. 16/491,088.
Non-Final Rejection dated Jan. 15, 2021 for U.S. Appl. No. 16/224,708.
Notice of Allowance and Fees Due (PTOL-85) dated Aug. 27, 2021 for U.S. Appl. No. 16/224,708.
Notice of Allowance and Fees Due (PTOL-85) dated Jul. 8, 2021 for U.S. Appl. No. 16/224,708.
Notice of Allowance and Fees Due (PTOL-85) dated Sep. 9, 2021 for U.S. Appl. No. 16/224,708.
Notice of Allowance and Fees Due (PTOL-85) dated Sep. 28, 2021 for U.S. Appl. No. 16/224,708.
Notice of Allowance received for U.S. Appl. No. 13/147,787, dated Jun. 26, 2017.
Notice of Allowance received for U.S. Appl. No. 13/805,602, dated Mar. 21, 2016.
Notice of Allowance received for U.S. Appl. No. 14/357,183, dated Jan. 29, 2016.
Notice of Allowance received for U.S. Appl. No. 14/357,190, dated Dec. 5, 2017.
Notice of Allowance received for U.S. Appl. No. 14/357,190, dated Jan. 12, 2018.
Notice of Allowance received for U.S. Appl. No. 14/370,729, dated May 21, 2018.
Notice of Allowance received for U.S. Appl. No. 14/970,224, dated Aug. 13, 2018.
Notice of Allowance received for U.S. Appl. No. 29/419,922, dated Nov. 29, 2013.
Office Action received for U.S. Appl. No. 13/147,787, dated Aug. 27, 2014.
Office Action received for U.S. Appl. No. 13/147,787, dated Oct. 28, 2016.
Office Action received for U.S. Appl. No. 13/147,787, dated Sep. 30, 2015.
Office Action received for U.S. Appl. No. 13/805,602, dated Dec. 2, 2015.
Office Action received for U.S. Appl. No. 14/357,183, dated Jul. 16, 2015.
Office Action received for U.S. Appl. No. 14/357,190, dated Feb. 17, 2017.
Office Action received for U.S. Appl. No. 14/370,729, dated Dec. 19, 2017.
Office Action received for U.S. Appl. No. 14/370,729, dated Jan. 26, 2017.
Office Action received for U.S. Appl. No. 14/970,224, dated May 30, 2018.
Office Action received for U.S. Appl. No. 15/616,688, dated Mar. 19, 2020.
Office Action received for U.S. Appl. No. 15/872,770, dated Mar. 27, 2020.
Office Action received for U.S. Appl. No. 15/901,089, dated Apr. 13, 2020.
Office Action received for U.S. Appl. No. 16/109,261, dated Apr. 28, 2020.
Office Action received for U.S. Appl. No. 29/419,922, dated Aug. 6, 2013.
Outgoing—ISA/210—International Search Report dated Jun. 7, 2018 for WO Application No. PCT/US18/020928.

(56) References Cited

OTHER PUBLICATIONS

Outgoing—ISA/210—International Search Report dated Jun. 9, 2020 for WO Application No. PCT/US19/049535.
Outgoing—ISA/210—International Search Report dated Jun. 26, 2020 for WO Application No. PCT/US20/012519.
Requirement for Restriction/Election dated Jun. 11, 2020 for U.S. Appl. No. 16/224,708.
RU Office Action dated Jun. 24, 2021 for RU Application No. 2019130055.
RU Search report dated Jun. 24, 2021 for RU Application No. 2019130055.
SE Search report dated Nov. 16, 2020 for SE Application No. 2050379.

* cited by examiner

APPARATUS, SYSTEM, AND METHOD FOR ERECTING BOXES

CROSS-REFERENCE TO RELATED APPLICATIONS

The present application is a divisional of U.S. patent application Ser. No. 16/224,708, filed Dec. 18, 2018, entitled Apparatus, System, and Method for Erecting Boxes, which claims the benefit of priority to U.S. Provisional Patent Application No. 62/607,796, filed Dec. 19, 2017, entitled Apparatus, System, and Method for Erecting Boxes, and U.S. Provisional Patent Application No. 62/607,247, filed Dec. 18, 2017, entitled Apparatus, System, and Method for Erecting Boxes, the entire content of each of the foregoing applications is incorporated herein by this reference.

FIELD

This application relates generally to erecting boxes. In particular, this application relates to an apparatus, system and method for erecting different size boxes of continuous corrugated material.

BACKGROUND

Continuous corrugated material allows for users to construct packages and boxes of all different sizes and specifications. Continuous corrugated material allows for flexibility as fewer sizes of boxes and packaging, etc. need to be held in stock. Continuous corrugated material can be creased, cut, and scored into any number of styles and sizes.

The continuous corrugated material includes stacking folds. As the continuous corrugated material can be constructed into boxes and packaging of all different sizes, the location of the stacking fold may end up anywhere on a particular size box. The stacking fold is an inherent weak point of the box and ultimately hinders conventional box erecting machines and processes.

The subject matter of the present application has been developed in response to the present state of the art, and in particular, in response to the problems and disadvantages associated with conventional diffusing apparatuses and processes that have not yet been fully solved by currently available techniques. Accordingly, the subject matter of the present application has been developed to provide embodiments of a system, an apparatus, and a method that overcome at least some of the above-discussed shortcomings of prior art techniques. For example, according to one implementation, a method of erecting a box is disclosed.

Disclosed herein is a method for erecting a box according to one or more examples of the present disclosure. The method for erecting a box includes positioning an unerected box in an automated erecting apparatus. The method further includes bending major and minor flaps on the unerected box relative to sides of the unerected box. The method further includes, while the major and minor flaps are bent relative to the sides of the unerected box, performing an automated opening operation on the unerected box, wherein the unerected box includes a stacking fold. The preceding subject matter of this paragraph characterizes example 1 of the present disclosure.

Bending the major and minor flaps on the box includes bending a first set of flaps in a first direction and bending a second set of flaps in a second direction.

The preceding subject matter of this paragraph characterizes example 2 of the present disclosure, wherein example 2 also includes the subject matter according to example 1, above.

The first direction is opposite the second direction. The preceding subject matter of this paragraph characterizes example 3 of the present disclosure, wherein example 3 also includes the subject matter according to any one of examples 1-2, above.

The method further includes indexing the unerected box in a starting position within the automated erecting apparatus, wherein the unerected box is positioned on a table with the major and minor flaps overhanging a table edge. The preceding subject matter of this paragraph characterizes example 4 of the present disclosure, wherein example 4 also includes the subject matter according to any one of examples 1-3, above.

The stacking fold is located on a side of the unerected box. The preceding subject matter of this paragraph characterizes example 5 of the present disclosure, wherein example 5 also includes the subject matter according to any one of examples 1-4, above.

The unerected box includes four sides, wherein a first set of two sides are coplanar and a second set of two sides are coplanar, wherein the four sides are parallel to each other. The preceding subject matter of this paragraph characterizes example 6 of the present disclosure, wherein example 6 also includes the subject matter according to any one of examples 1-5, above.

The unerected box includes four corner creases, wherein the corner creases are positioned between two respective sides of the unerected box. The preceding subject matter of this paragraph characterizes example 7 of the present disclosure, wherein example 7 also includes the subject matter according to any one of examples 1-6, above.

The stacking fold is located on one of the four sides separate from the corner creases. The preceding subject matter of this paragraph characterizes example 8 of the present disclosure, wherein example 8 also includes the subject matter according to any one of examples 1-7, above.

Bending the plurality of major and minor flaps on the box includes bending a first major flap and a first minor flap in a first direction, wherein bending the plurality of major and minor flaps on the box further includes bending a second major flap and a second minor flap in a second direction. The preceding subject matter of this paragraph characterizes example 9 of the present disclosure, wherein example 9 also includes the subject matter according to any one of examples 1-8, above.

The automated opening operation includes suctioning at least one side of the unerected box and rotating one side of the unerected box relative to another side of the unerected box to form an erected box. The preceding subject matter of this paragraph characterizes example 10 of the present disclosure, wherein example 10 also includes the subject matter according to any one of examples 1-9, above.

Each of the four sides of the erected box is orthogonal to respective adjacent sides of the erected box. The preceding subject matter of this paragraph characterizes example 11 of the present disclosure, wherein example 11 also includes the subject matter according to any one of examples 1-10, above.

The method further includes performing automated folding operations to fold the major and minor flaps such that the major and minor flaps are orthogonal to the sides of the erected box. The preceding subject matter of this paragraph characterizes example 12 of the present disclosure, wherein example 12 also includes the subject matter according to any one of examples 1-11, above.

The method further includes reinforcing the stacking fold by bending the major and minor flaps relative to the sides of the unerected box. The preceding subject matter of this paragraph characterizes example 13 of the present disclosure, wherein example 13 also includes the subject matter according to any one of examples 1-12, above.

The unerected box includes more than one stacking fold located on one of the four sides separate from the corner creases. The preceding subject matter of this paragraph characterizes example 14 of the present disclosure, wherein example 14 also includes the subject matter according to any one of examples 1-13, above.

Disclosed herein is a system for erecting a box according to one or more examples of the present disclosure. The system includes at least one unerected box. The system further includes an automated erecting apparatus including a first folding arm configured to bend a first major and a first minor flap in a first direction on an unerected box, a second folding arm configured to bend a second major and a second minor flap in a second direction on the unerected box, and a suction panel configured to erect the unerected while the major and minor flaps are bent, wherein the box includes a stacking fold. The preceding subject matter of this paragraph characterizes example 15 of the present disclosure.

The first direction is opposite the second direction. The preceding subject matter of this paragraph characterizes example 16 of the present disclosure, wherein example 16 also includes the subject matter according to example 15, above.

The unerected box includes four sides. A first set of two sides are coplanar and a second set of two sides are coplanar. The four sides are parallel to each other. The preceding subject matter of this paragraph characterizes example 17 of the present disclosure, wherein example 17 also includes the subject matter according to anyone of examples 15-16, above.

The unerected box includes four corner creases, wherein the corner creases are positioned between two respective sides of the unerected box. The preceding subject matter of this paragraph characterizes example 18 of the present disclosure, wherein example 18 also includes the subject matter according to any one of examples 15-17, above.

The stacking fold is located on one of the four sides separate from the corner creases. The preceding subject matter of this paragraph characterizes example 19 of the present disclosure, wherein example 19 also includes the subject matter according to any one of examples 15-18, above.

The unerected box includes more than one stacking fold located on one of the four sides separate from the corner creases. The preceding subject matter of this paragraph characterizes example 20 of the present disclosure, wherein example 20 also includes the subject matter according to any one of examples 15-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter disclosed herein will be readily understood, a more particular description of the subject matter disclosed herein briefly described above will be rendered by reference to specific embodiments that are illustrated in the appended drawings. Understanding that these drawings depict only typical embodiments of the subject matter disclosed herein and are not therefore to be considered to be limiting of its scope, the subject matter disclosed herein will be described and explained with additional specificity and detail through the use of the accompanying drawings, in which.

DETAILED DESCRIPTION

Figure 1:
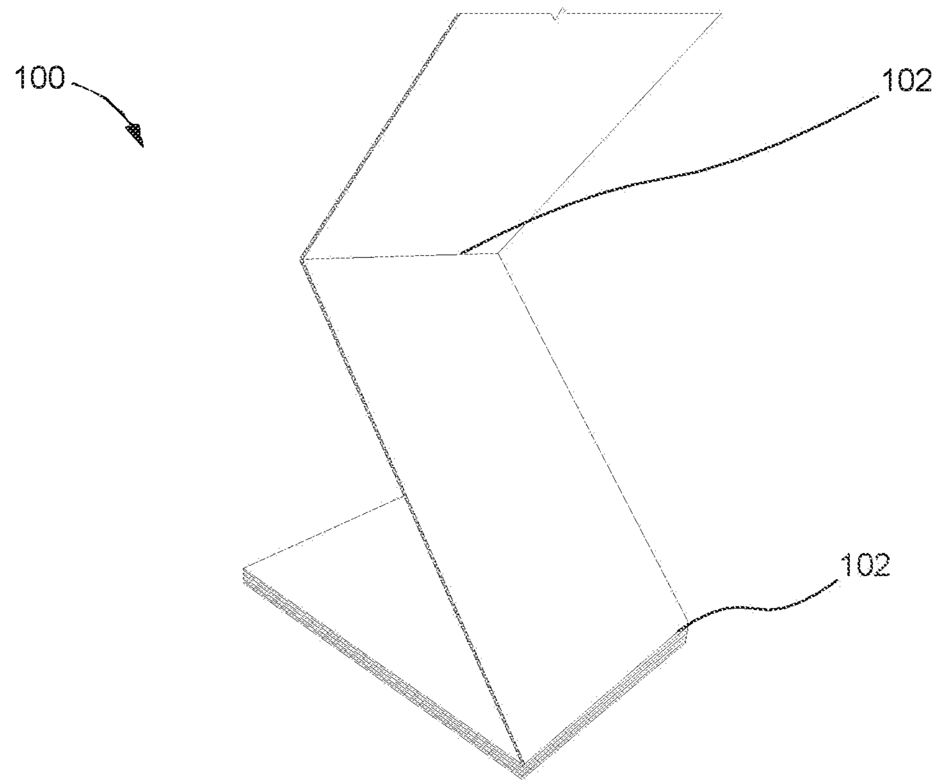
FIG. 1 is a perspective view illustrating one embodiment of a continuous corrugated material in accordance with one embodiment of the subject matter disclosed herein.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the subject matter disclosed herein may be embodied as a system, method, apparatus, and/or computer program product. Accordingly, aspects of the subject matter disclosed herein may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the subject matter disclosed herein may take the form of a computer program product embodied in one or more computer readable medium(s) having program code embodied thereon.

Many of the functional units described in this specification may be labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the subject matter disclosed herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the subject matter disclosed herein.

Aspects of the subject matter disclosed herein are described herein with reference to flowchart illustrations and/or block diagrams of methods, apparatus (systems), and computer program products according to embodiments of the subject matter disclosed herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification may be labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The Figures illustrate the architecture, functionality, and operation of possible implementations of apparatuses, systems, methods and computer program products according to various embodiments of the subject matter disclosed herein. In this regard, each step may represent a module, segment, or portion of code, which comprises one or more executable instructions of the program code for implementing the specified logical function(s).

It should also be noted that, in some alternative implementations, the functions noted may occur out of the order noted in the Figures. For example, two steps shown in succession may, in fact, be executed substantially concurrently, or the steps may sometimes be executed in the reverse order, depending upon the functionality involved. Other steps and methods may be conceived that are equivalent in function, logic, or effect to one or more blocks, or portions thereof, of the illustrated Figures.

FIG. 1 is a perspective view illustrating one embodiment of a continuous corrugated material 100 in accordance with one embodiment of the subject matter disclosed herein. Continuous corrugated material 100 allows for users to construct packages and boxes of all different sizes and specifications. Continuous corrugated material 100 allows for flexibility as fewer sizes of boxes and packaging, etc. need to be held in stock. Continuous corrugated material 100 can be creased, cut, and scored into any number of styles and sizes.

The continuous corrugated material 100 comes in a folded stack in which the continuous corrugated material 100 is folded back and forth in a fan configuration or accordion configuration. The continuous corrugated material 100 includes stacking folds 102. As the continuous corrugated material 100 can be constructed into boxes and packaging of all different sizes, the location of the stacking fold 102 may end up anywhere on a particular size box. The stacking fold 102 is an inherent weak point of the box and ultimately hinders conventional box erecting machines and processes.

Figure 2:
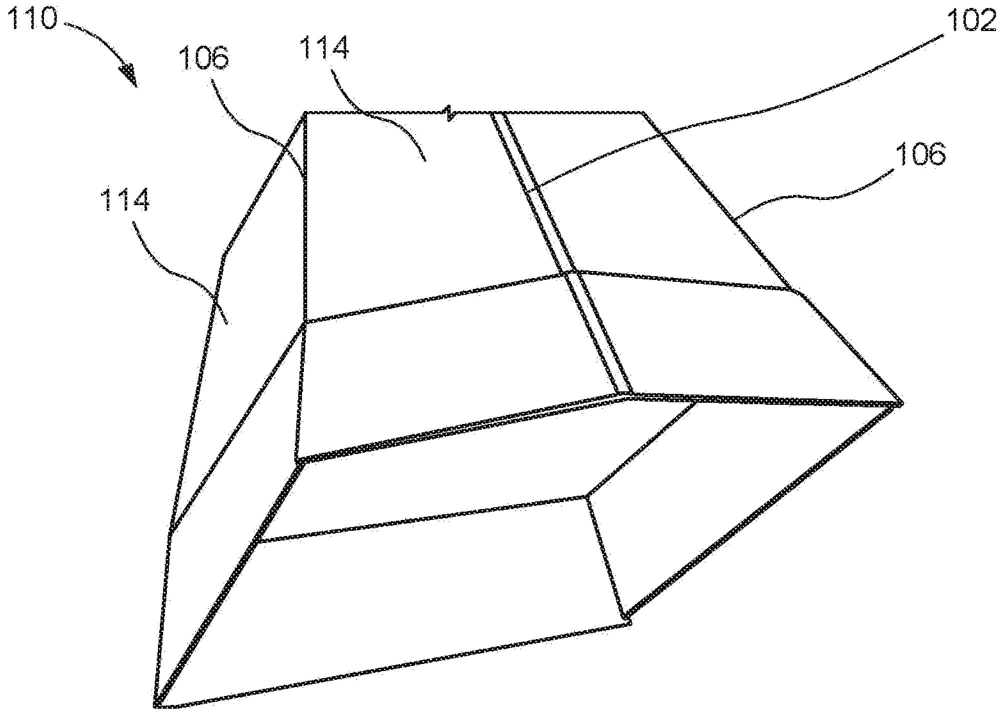
FIG. 2 is a perspective view illustrating one embodiment of a box erected with a stacking fold on a panel in accordance with one embodiment of the subject matter disclosed herein.

In conventional box erecting processes as the flat box is opened, the box may bend at the stacking fold 102 instead of the box edge or corner crease 106. Referring to FIG. 2, a box made of continuous corrugated material 100 has been opened by a conventional box erecting process. As is shown, the stacking fold 102 is located on a side panel 114 of the box 110. The stacking fold 102 is a weak point. The box 110 may bend at the stacking fold 102 instead at the designated box edge or corner crease 106. Because of this and other issues standard box erecting machines and processes are troublesome and unreliable for erecting boxes from continuous corrugated material 100.

Figure 3:
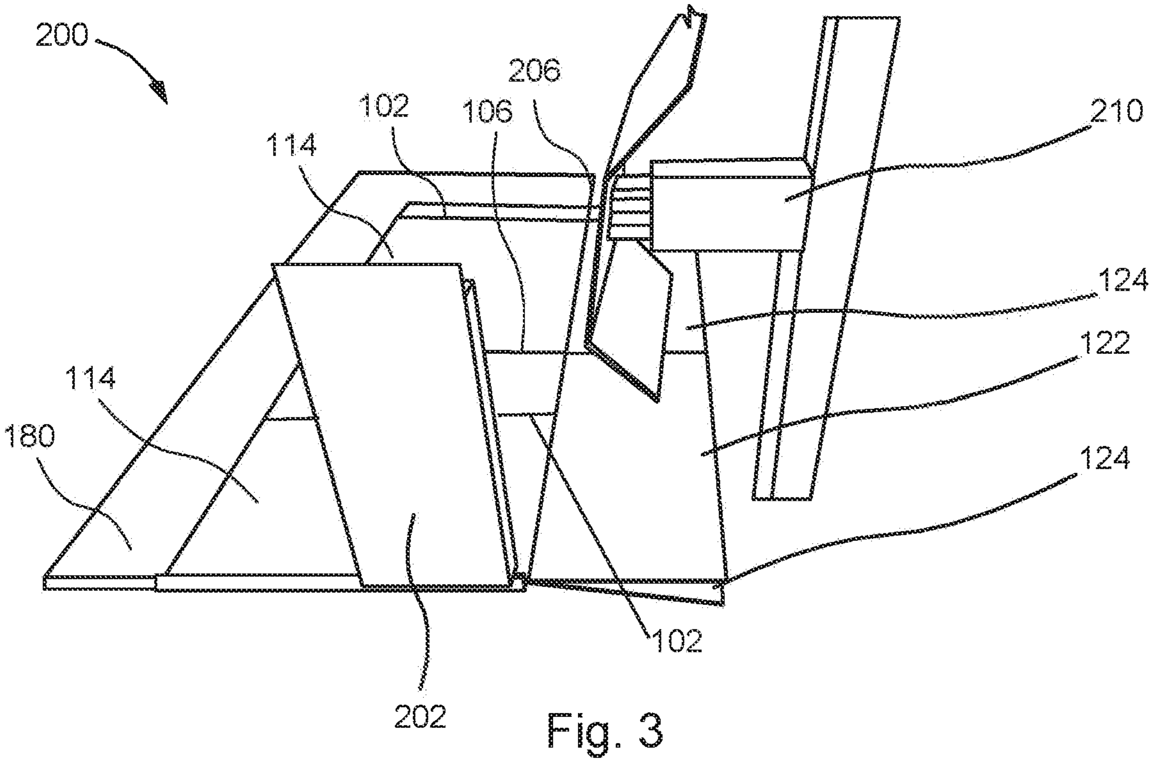
FIG. 3 is a perspective view illustrating one embodiment of a box erecting system in accordance with one embodiment of the subject matter disclosed herein.

Disclosed herein are embodiment of systems, apparatuses, and methods of erecting a box that overcome and mitigate the shortcomings of conventional techniques. FIG. 3 is a perspective view illustrating one embodiment of a box erecting system 200 in accordance with one embodiment of the subject matter disclosed herein. The box erecting system 200 may include an apparatus and various special purpose hardware-based systems that perform the specified functions or acts, or combinations of special purpose hardware and computer instructions. In certain embodiments, the box erecting system 200 may be usable in a warehouse, a distribution center, and/or the like, for erecting boxes, for example. The box erecting system 200, in certain embodiments, includes one or more conveyors or movable robotic arms that implement the various steps described herein. The process described in conjunction with FIGS. 3-14 is illustrative only and could be implemented with fewer or more parts and/or steps than described herein.

In certain embodiments, the box erecting system 200 is configured to receive one or more boxes 110 of various sizes. The one or more boxes 110 may be manufactured of continuous corrugated material 100 or the like. The one or more boxes 110 may include one or more stacking folds 102 at any location on the boxes 110.

In some embodiments, the box erecting system 200 includes an indexing system (not shown) that indexes a flat box 110 in the position shown in FIG. 3. The box 110 is located with the flaps overhanging from an edge 206 of a table 180. The crease or fold of the flaps is located at the table edge 206. In some embodiments, the crease or fold of the flaps is located near the table edge 206. Various indexing systems may be utilized to position the flat box 110 in the appropriate position within the box erecting system 200 and are not explained in detail for the sake of brevity.

In some embodiments, the box erecting system 200 includes a suction panel 202, a restraining bar 214 and a first folding arm 210. Other embodiments of the box erecting system 200 may include fewer or more components, to implement fewer or more functions.

Figure 4:
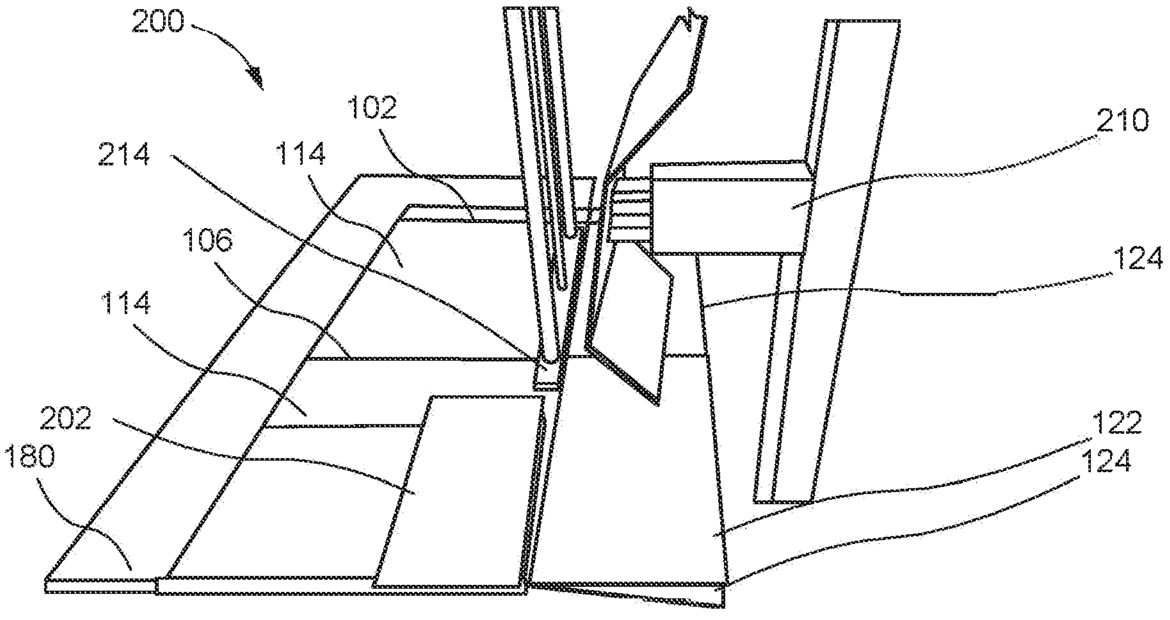
FIG. 4 is a perspective view illustrating one embodiment of a box erecting system with a restraining bar engaged in accordance with one embodiment of the subject matter disclosed herein.

Referring to FIG. 4, the box 110 is in the appropriate position with the flaps overhanging from a table edge 206. The box erecting system 200 is configured to hold the box 110 in place. In the illustrated embodiment, the box 110 is held in place by are straining bar 214 which actuated down. The restraining bar 214 is pressing down on the box 110 at the table edge 206. In some embodiments, the restraining bar 214 aligns with the table edge 206. In addition to the restraining bar 214, the box erecting system 200 includes a suction panel 202 which has rotated down and is further pressing down and holding the box 110 in place. Although depicted and shown with a restraining bar 214 and a suction panel 202, the box erecting system 200 may utilize other components to hold the box 110 in place.

The box 110 includes four flaps on each side of the box 110. The flaps are designated as major flaps 124 and minor flaps 122. The minor flaps 122 are equal to or shorter in length than the major flaps 124. The flaps are stacked in two groups. The first group located near the suction panel 202 includes a minor flap 122 on top and a major flap 124 on bottom. The second group located by the restraining bar 214 includes a major flap 124 on top and a minor flap 122 on bottom.

Figure 5:
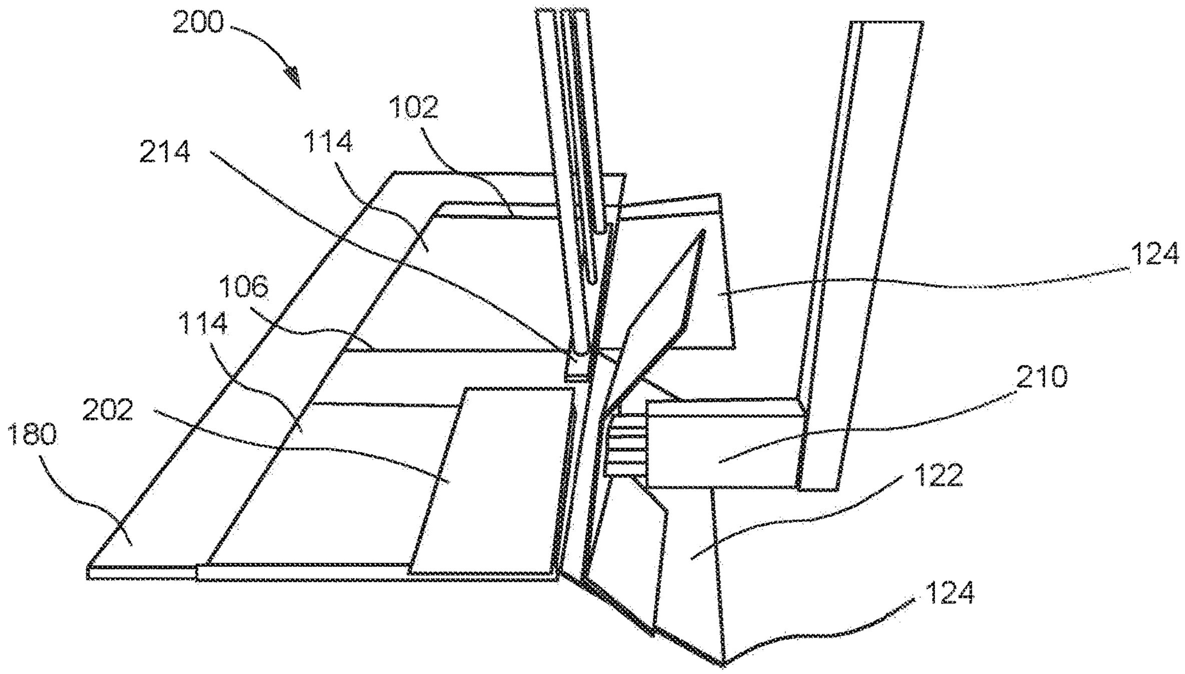
FIG. 5 is a perspective view illustrating one embodiment of a box erecting system with a first folding arm engaging a first group of flaps in accordance with one embodiment of the subject matter disclosed herein.

Referring now to FIG. 5, the first folding arm 210 has been actuated down in a first direction. The first folding arm 210 includes one or more angled panels that engage the first group of flaps and bends them over the table edge 206 (in the direction of arrow 312 in FIG. 6). The first folding arm 210 engages the minor flap 122 which, in turn, engages the major flap 124. The first group of flaps is held in a folded position. The width of the first folding arm 210 is configured to engage the first group of flaps without engaging the second group of flaps.

Figure 6:
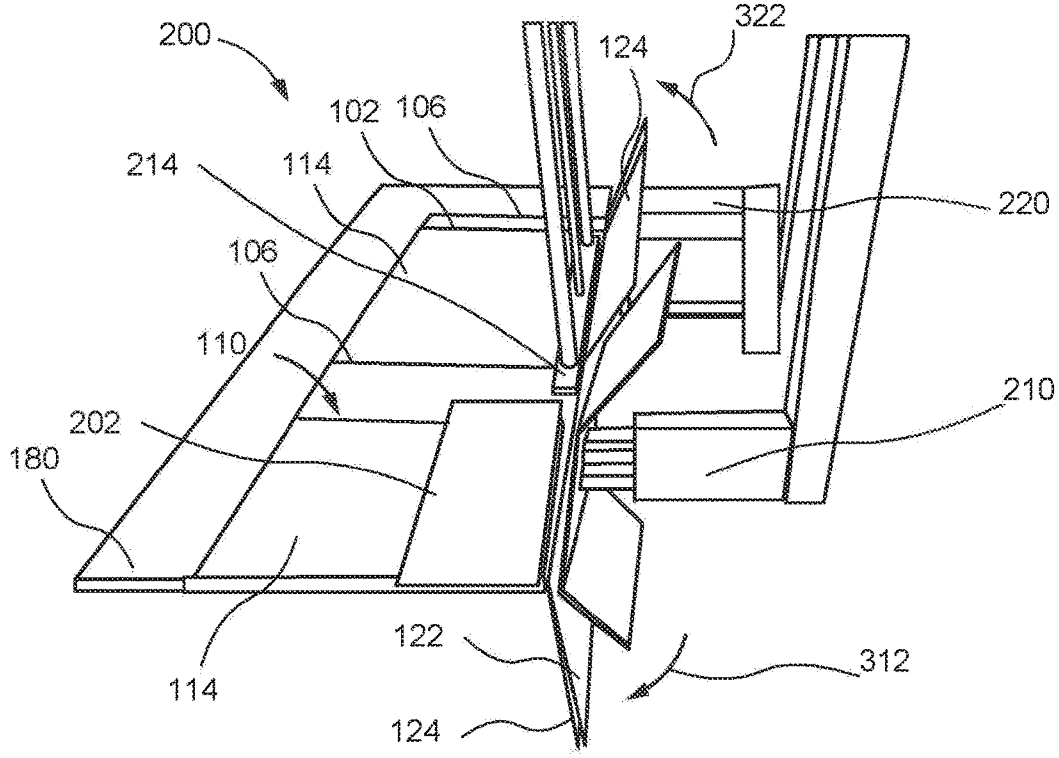
FIG. 6 is a perspective view illustrating one embodiment of a box erecting system with a second folding arm engaging a second group of flaps in accordance with one embodiment of the subject matter disclosed herein.

Referring now to FIG. 6, a second folding arm 220 is actuated to engage the second group of flaps. The second folding arm 220 is engaged from an opposite side of the box 110 from the first folding arm 210 and is actuated in a second direction opposite the first direction that the first folding arm 210 moves. The second folding arm 220 bends the second group of flaps over restraining bar 214 (in the direction of arrow 322). The second folding arm 220 is configured to engage the minor flap 122 located on the bottom of the second group of flaps which, in turn, engages the major flap 124 on the top of the second group of flaps. The width of the second folding arm 220 is configured to engage the second group of flaps without engaging the first group of flaps.

As is shown in FIG. 6, the first group of flaps and the second group of flaps are folded over in opposite directions. While the process of folding the flaps is shown implemented by the first folding arm 210 and the second folding arm 220, the process of folding the flaps may be accomplished by other components configured to function similarly to the first folding arm 210 and the second folding arm 220. In addition, although shown as two distinct steps, the folding of the flaps may occur simultaneously or concurrently.

Further depicted in FIG. 6, the first folding arm 210 is shown with the angled panel actuated perpendicular to the flat box to maintain bent panels for subsequent steps.

Figure 7:
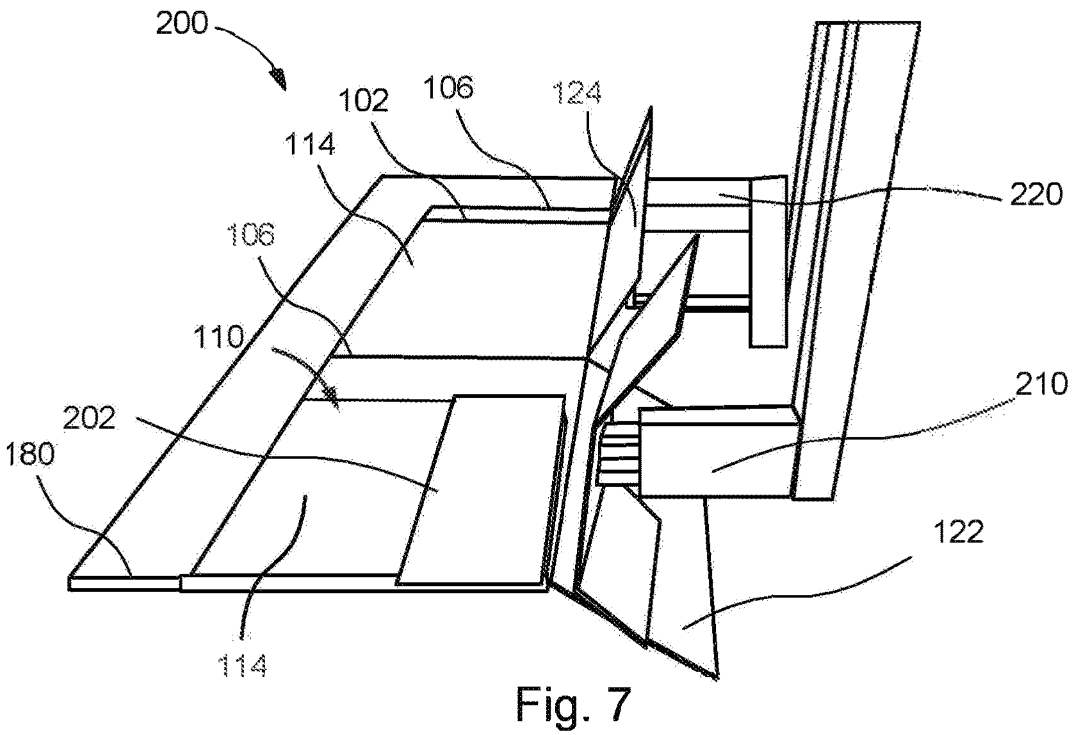
FIG. 7 is a perspective view illustrating one embodiment of a box erecting system with the flaps in a semi-folded position in accordance with one embodiment of the subject matter disclosed herein.

Referring now to FIG. 7, the restraining bar 214 has been retracted or actuated up and no longer is holding the box 110 in place. With the restraining bar 214 retracted, the box 110 can now be opened or erected. The suction panel 202 includes a plurality of suction cups which can be actuated to grip the side panel of the box 110.

Figure 8:
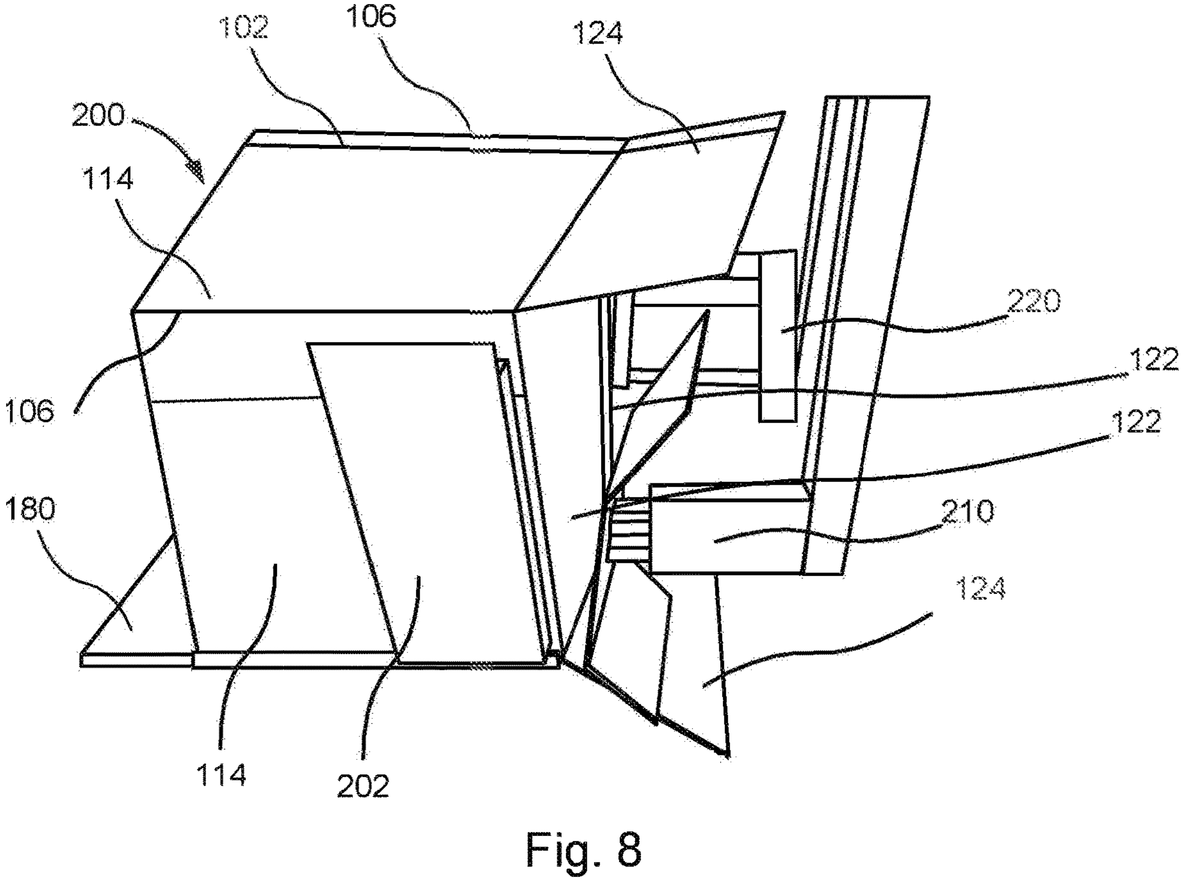
FIG. 8 is a perspective view illustrating one embodiment of a box erecting system with the box in an open position in accordance with one embodiment of the subject matter disclosed herein.

Referring now to FIG. 8, the suction panel 202 is rotated up approximately ninety degrees. The suction panel 202 is rotated while the suction cups are gripping the side panel of the box 110. In addition, the suction panel 202 is rotated while the flaps are in a folded position. With the flaps in a folded position, no matter where the stacking fold 102 is located, the bent flaps provide strength to the weak seam of the stacking fold 102. As can be seen in FIGS. 7 and 8, the stacking fold 102 is located on a side panel of the box 110. With the flaps in a bent position, the box 110 rotates to open and does not bend at the stacking fold 102 but at the appropriate box edge or corner crease.

Referring again to FIG. 8, as the box 110 is erected to an open position, the first folding arm 210 and the second folding arm 220 stay in position. As such, the minor flaps 122 (which are now in a vertical position) are both held in a folded position. The minor flaps 122 are both folded inwards to the center of the box 110. The major flaps 124 (which are now in a horizontal position) are not folded inwards to the center of the box 110.

Figure 9:
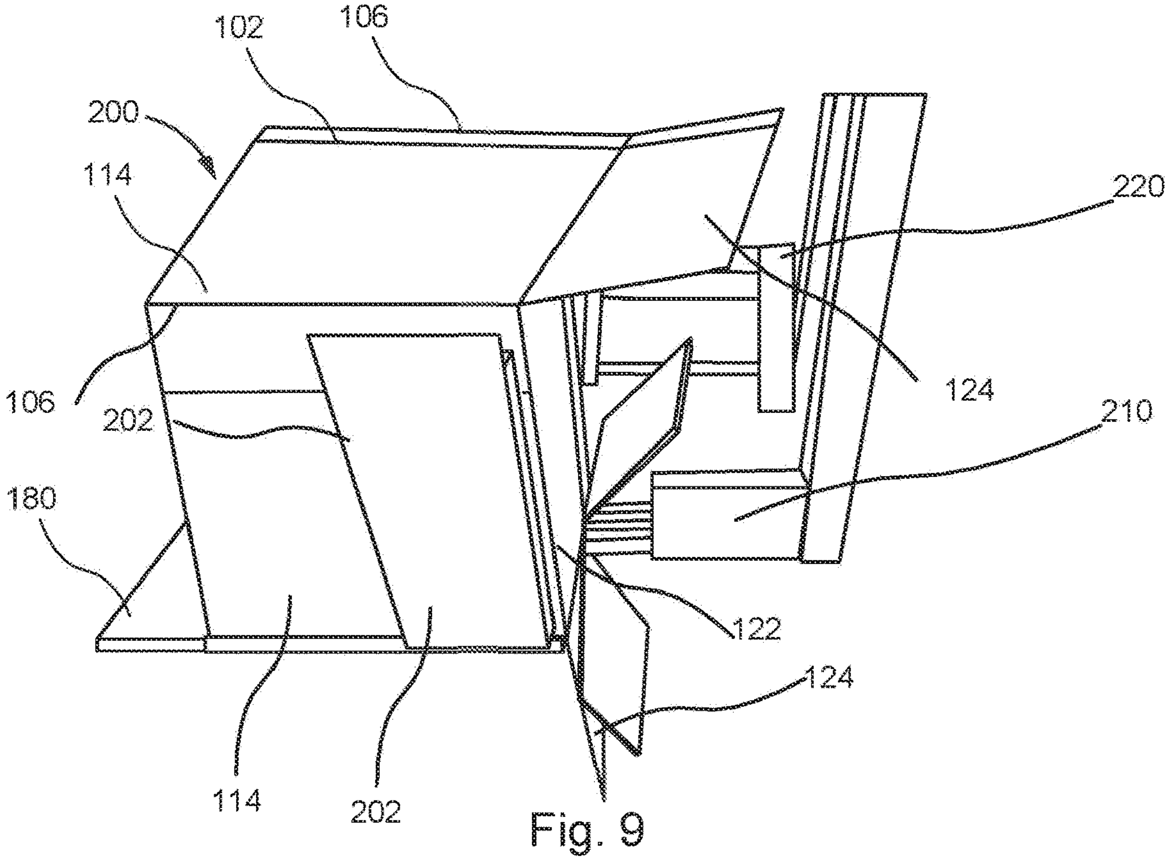
FIG. 9 is a perspective view illustrating one embodiment of a box erecting system with the minor flaps of the box in a folded position in accordance with one embodiment of the subject matter disclosed herein.
Figure 10:
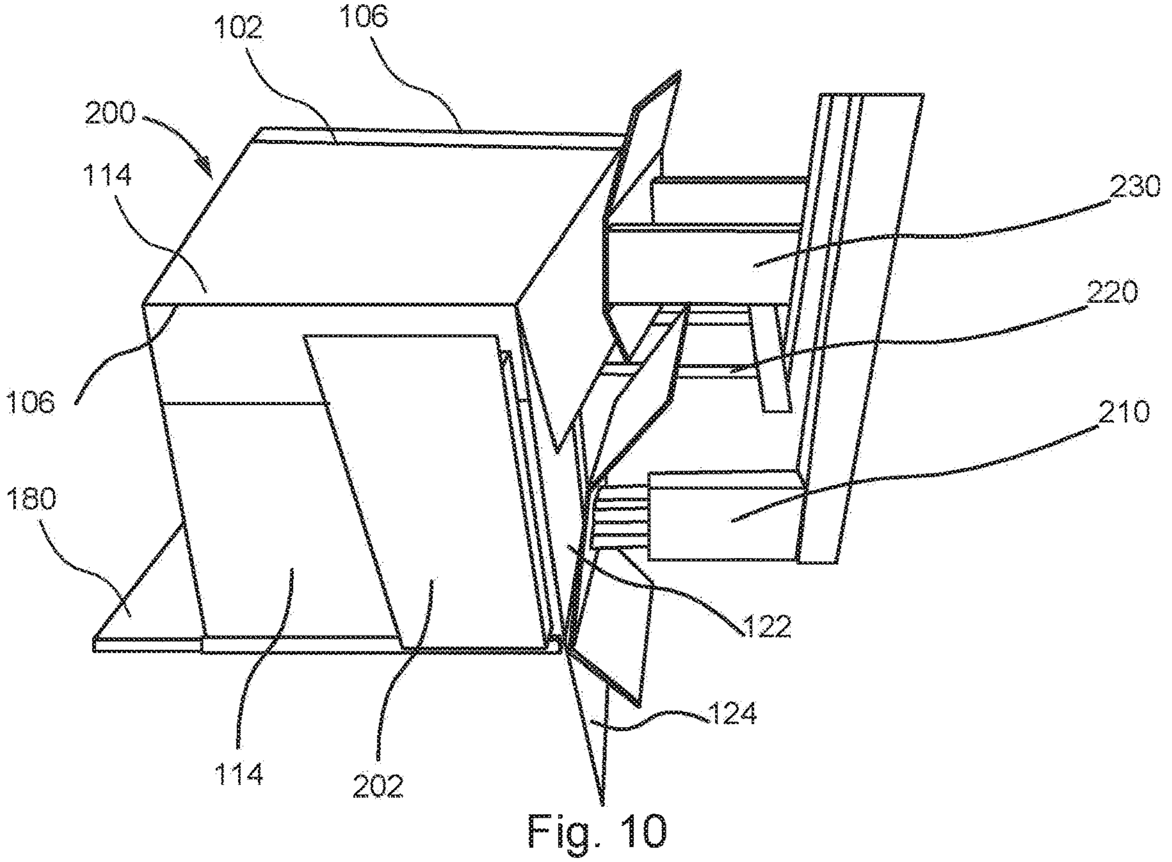
FIG. 10 is a perspective view illustrating one embodiment of a box erecting system with a third folding arm engaging an upper major flap in accordance with one embodiment of the subject matter disclosed herein.

Referring now to FIG. 9, the first folding arm 210 and the second folding arm 220 are each actuated towards the box 110 to fold the minor flaps 122 to a ninety degree angle from the side panels of the box 110. With the minor flaps 122 folded the upper major flap 124 can be folded inwards to the center of the box 110. Referring to FIG. 10, a third folding arm 230 is actuated down to engage the upper major flap 124 and fold the upper major flap 124 down to cover the minor flaps 122.

Figure 11:
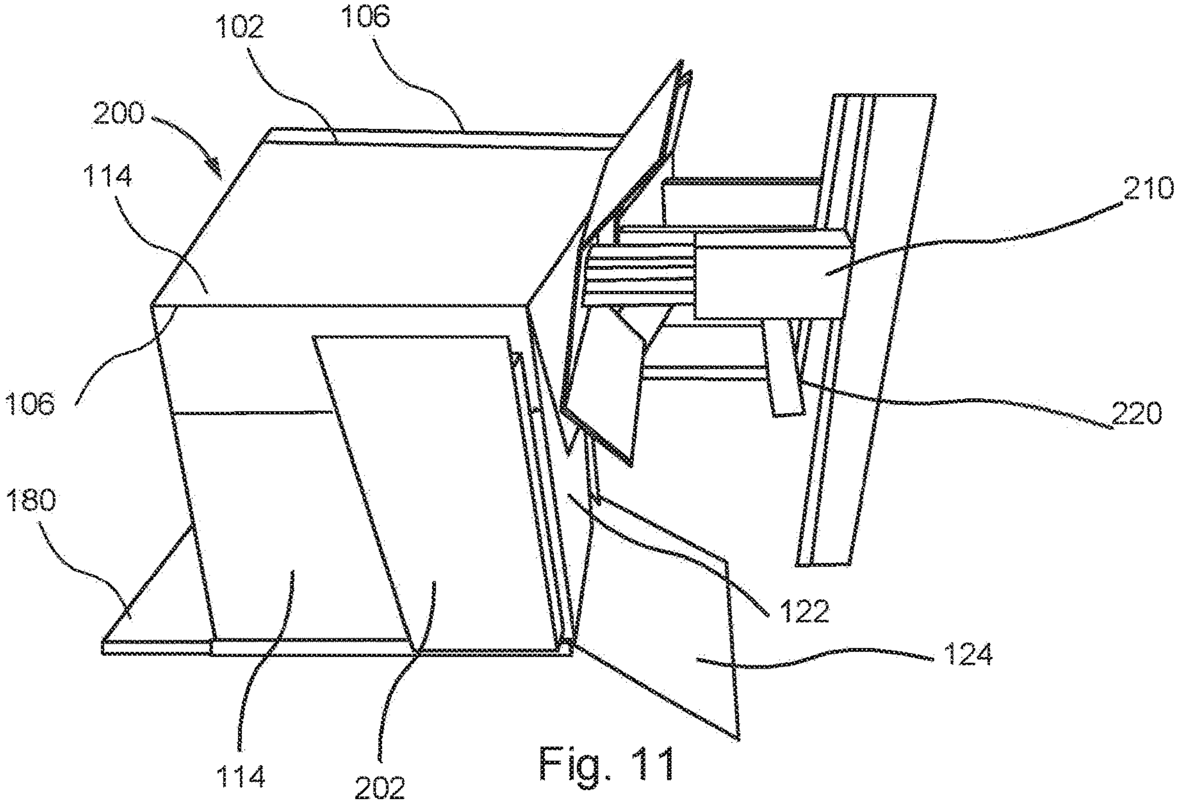
FIG. 11 is a perspective view illustrating one embodiment of a box erecting system with the second folding arm in a cleared position in accordance with one embodiment of the subject matter disclosed herein.

Referring now to FIG. 11, the first folding arm 210 has been actuated up to engage the upper major flap 124 and the second folding arm 220 has been actuated down to clear the lower major flap 124. As shown in this position, the minor flaps 122 and the upper major flap 124 are in a folded position, each at approximately ninety degrees from the side panels.

Figure 12:
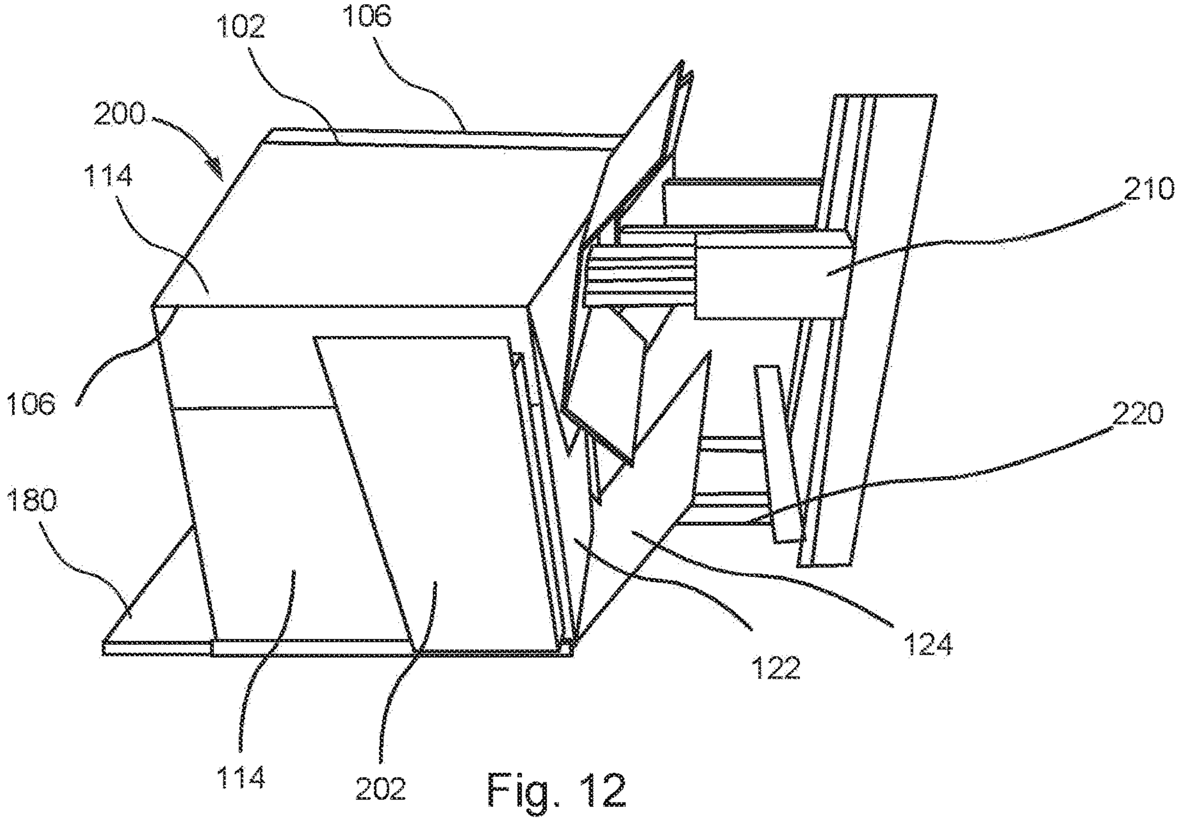
FIG. 12 is a perspective view illustrating one embodiment of a box erecting system with the second folding arm engaging the lower major flap in accordance with one embodiment of the subject matter disclosed herein.

Referring now to FIG. 12, the second folding arm 220 has been actuated back up to engage the lower major flap 124 and fold the lower major flap 124 inwards to the center of the box 110. As shown in this position, the minor flaps 122 and the upper major flap 124 are in a folded position, each at approximately ninety degrees from the side panels and the lower major flap 124 is in a semi-folded position.

Figure 13:
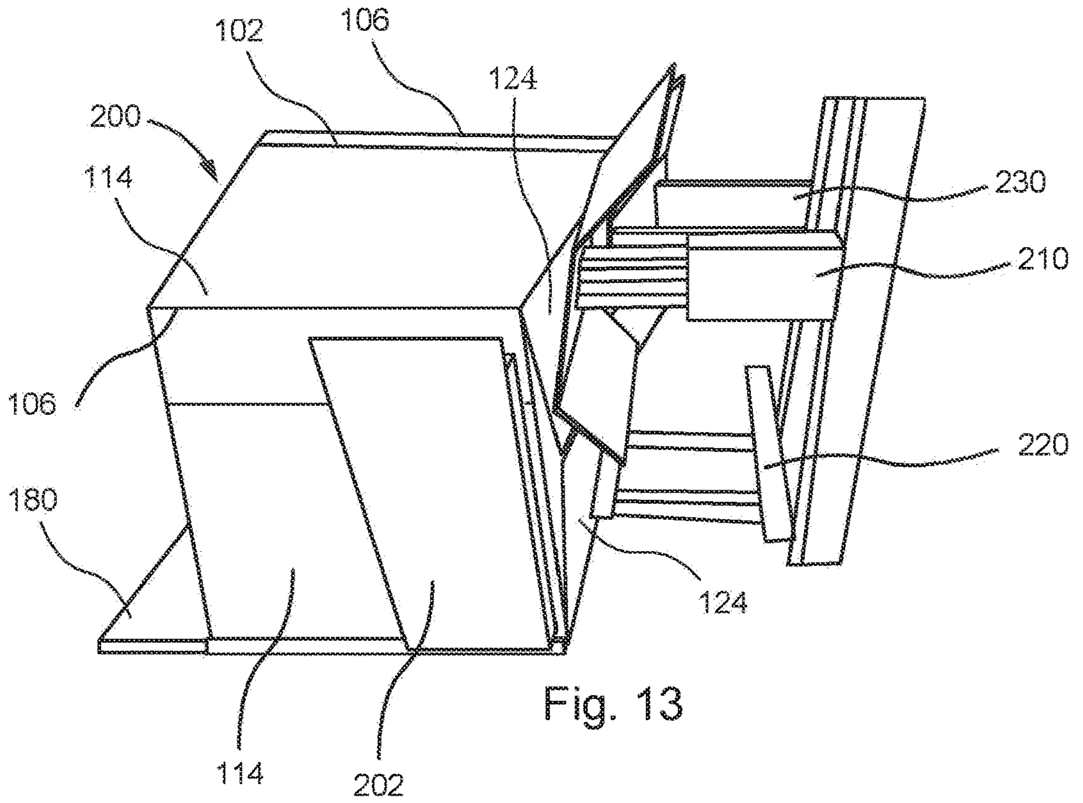
FIG. 13 is a perspective view illustrating one embodiment of a box erecting system with all flaps in a folded position in accordance with one embodiment of the subject matter disclosed herein.

Referring now to FIG. 13, the second folding arm 220 has been actuated towards the box 110 to fold the lower major flap 124 to position at approximately ninety degrees from the side panels. As shown in this position, the minor flaps 122 and the major flaps 124 are all in a folded position, each at approximately ninety degrees from the side panels.

Figure 14:
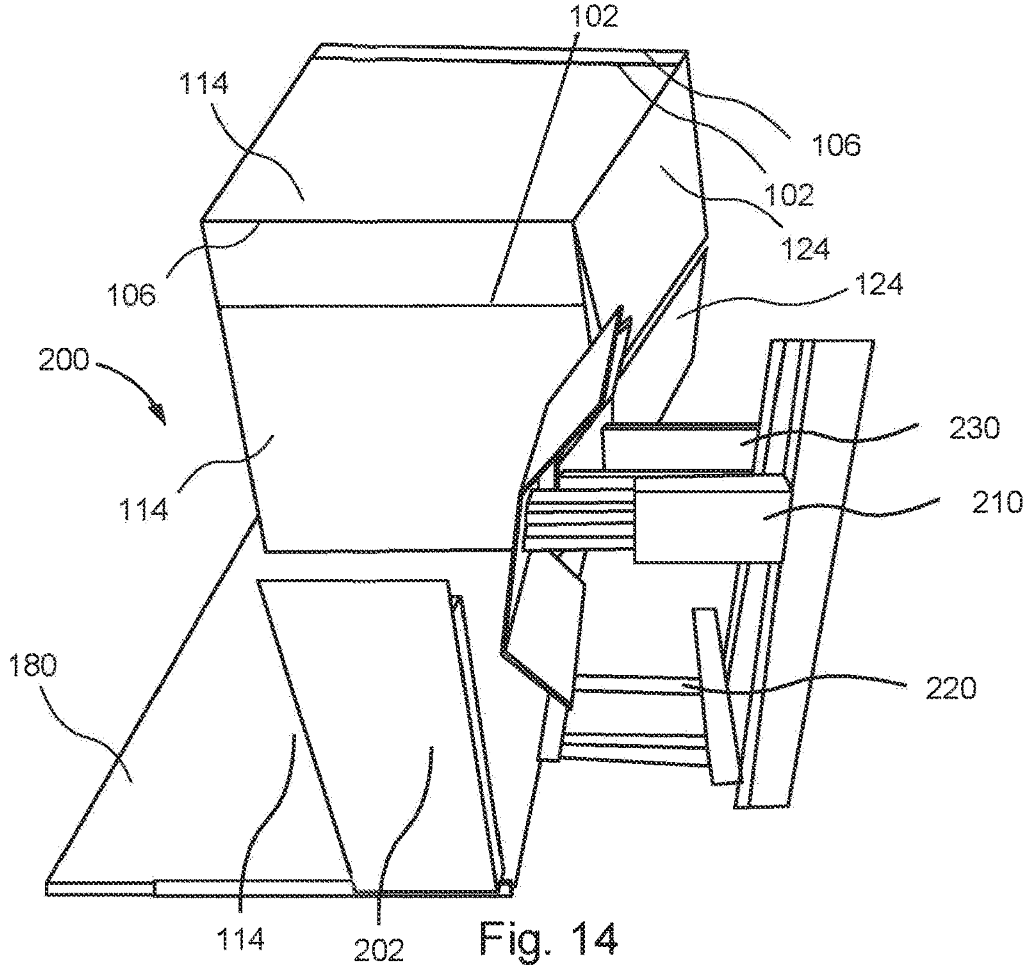
FIG. 14 is a perspective view illustrating one embodiment of a box erecting system with the box conveyed out with the box in a folded position in accordance with one embodiment of the subject matter disclosed herein.

Referring now to FIG. 14, the suction cups of the suction panel 202 have been disengaged and the box 110 is conveyed away from the box erecting system 200. The box erecting system 200 may be configured to convey the box 110 to a taping machine or other closure devise to fix flaps in place. The box erecting system 200 can now index another box into the starting position and proceed again through the processes described herein.

The processes described herein can be implemented in an automated system that quickly and efficiently erects boxes to an open position and folds the flaps on one side of the box. Each of the steps described in conjunction with FIGS. 3-14 may be implemented in an automated system. Computer readable program instructions may be used to implement the automated steps. In addition, some of the steps may be implemented simultaneously or concurrently. In some embodiments, fewer steps are implemented to erect a box.

In some embodiments, a method for erecting a box includes folding a first group of flaps and a second group of flaps in opposite directions. The method further includes opening to the box while the flaps are in folded positions. In some embodiments, the method is performed on a box with stacking fold located on a side panel of the box. In some embodiments, the flaps are folded by engaging a shorter flap which, in turn, engages a longer flap behind the shorter flap. That is, two flaps are folded by a single engagement mechanism.

The systems and methods described herein may be implemented to on-demand boxes of various sizes that have a false fold or score (stacking fold) located in random locations on the box. The systems and methods described herein strengthen the stacking fold located in random locations on the box by folding the flaps prior to opening the box. With the flaps in folded positions, the stacking fold is strengthened at the rigid corner where the flaps are bent. The strengthened stacking fold minimizes bending during the opening operation. Each box may have the false fold (stacking fold) or score located in a different location on the box. The systems and methods described herein may overcome the weakness of the stacking fold regardless of the location of the false fold or score on the box.

Figure 15:
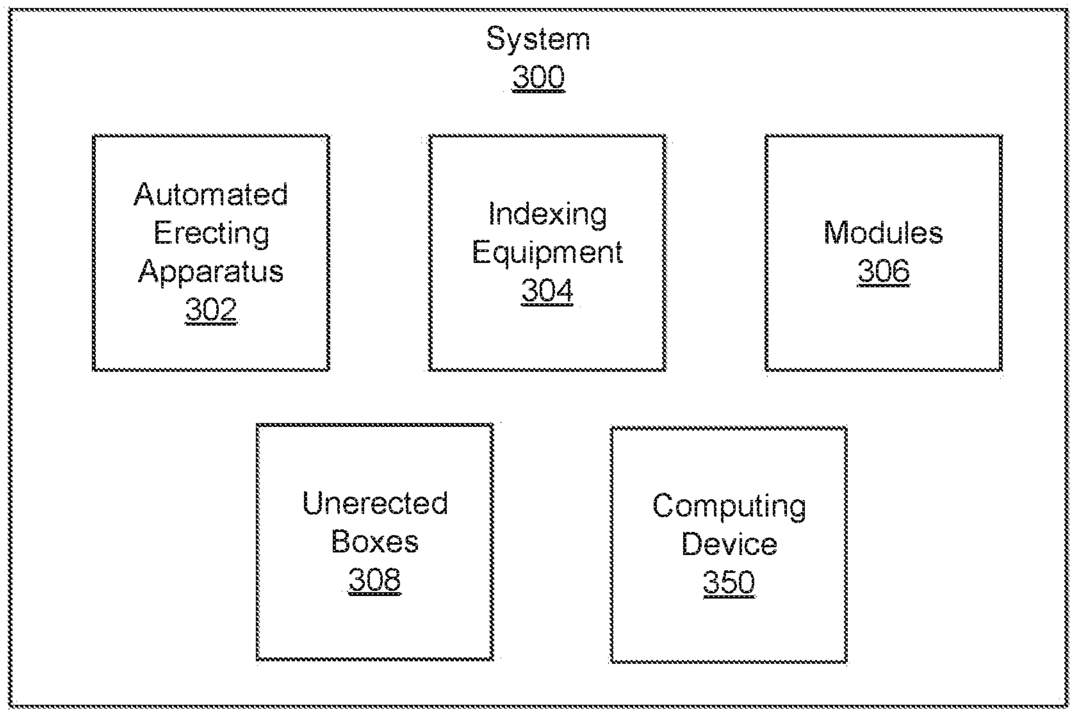
FIG. 15 is a schematic diagram of a system in accordance with one embodiment of the subject matter disclosed herein.

Referring now to FIG. 15, a system 300 according to one or more embodiments is shown. A system 300 for erecting a box according to one or more examples of the present disclosure includes a plurality of unerected boxes 308. In some embodiments, the unerected box 308 comprises four sides, wherein a first set of two sides are coplanar and a second set of two sides are coplanar, wherein the four sides are parallel to each other. In some embodiments, the unerected box 308 comprises four corner creases, wherein the corner creases are positioned between two respective sides of the unerected box 308. In some embodiments, the stacking fold 102 is located on one of the four sides separate from the corner creases 106.

The system further includes an automated erecting apparatus 302.

The automated erecting apparatus 302 may include the various features and components described herein including, but not limited to, the suction panel 202, the table 128, the restraining bar 214, the first folding arm 210, the second folding arm 220, the third folding arm 230, and other similar equipment. The automated erecting apparatus 302 may further include indexing equipment 304 for locating and positioning the unerected and erected boxes.

In some embodiments, the first folding arm is configured to bend a first major and a first minor flap in a first direction on the unerected box. In some embodiments, the second folding arm is configured to bend a second major and a second minor flap in a second direction on the unerected box. In some embodiments, the suction panel configured to erect the unerected while the major and minor flaps are bent. In some embodiments, the box comprises a stacking fold. In some embodiments, the first direction is opposite the second direction.

In some embodiments, the unerected box comprises more than one stacking fold located on one of the four sides separate from the corner creases.

In some embodiments, the system 300 may include a computing device 350 that is applicable to implement the embodiments of the present disclosure including control the automated erecting apparatus and perform the methods described herein. Computing device 350 is only illustrative and is not intended to suggest any limitation as to the scope of use or functionality of embodiments of the disclosure described herein. The components of Computing device 350 may include, but are not limited to, one or more processors or processing units, a system memory, I/O interfaces, and a bus that couples various system components including system memory to the processor.

The bus represents one or more of any of several types of bus structures, including a memory bus or memory controller, a peripheral bus, an accelerated graphic sport, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 350 typically includes a variety of computer system readable media. Such media may be any available media that is accessible by computing device 350, and it includes both volatile and non-volatile media, removable and non-removable media.

System memory can include computer system readable media in the form of volatile memory, such as random access memory (RAM) and/or cache memory. Computing device 350 may further include other removable/non-removable, volatile/non-volatile computer system storage media. By way of example only, storage system can be provided for reading from and writing to a storage media (not shown and typically called a "drive"). Although not shown, a magnetic disk drive for reading from and writing to a removable, non-volatile solid state drive, magnetic disk (e.g., a "floppy disk"), and an optical disk drive for reading from or writing to a removable, non-volatile optical disk such as a CD-ROM, DVD-ROM, or other optical media can be provided. In such instances, each can be connected to the bus by one or more data media interfaces. Computing devices 350 may include at least one program product having a set (e.g., at least one) of program modules 306 that are configured to carry out the functions of embodiments of the disclosure. In some embodiments, the program product is stored on the memory.

The program/utility, having a set (at least one) of program modules 306, may be stored in memory by way of example, and not limitation, as well as an operating system, one or more application programs, other program modules, and program data. Each of the operating system, one or more application programs, other program modules, and program data, or some combination thereof, may include an implementation of the system. Program modules 306 generally carry out the functions and/or methodologies of embodiments of the disclosure as described herein.

Computing device 350 may also communicate with one or more external devices such as a keyboard, a pointing device, a display, etc.; one or more devices that enable a user to interact with Computing device 350; any devices (e.g., network card, modem, etc.) that enable computer system 300 to communicate with one or more other computing devices. Such communication can occur via input/output (1/0) interfaces. Still yet, Computing device 350 can communicate with one or more networks such as a local area network (LAN), a general wide area network (WAN), a storage area network (SAN), and/or a public network (e.g., the Internet) via network adapter. A network adapter communicates with the other components of the Computing device 350 via bus. While not shown, other hardware and/or software components could be used in conjunction with computing device 350. Examples, include, but are not limited to, microcode, device drivers, redundant processing units, external disk drive arrays, RAID systems, tape drives, and data archival storage systems, etc.

Figure 16:
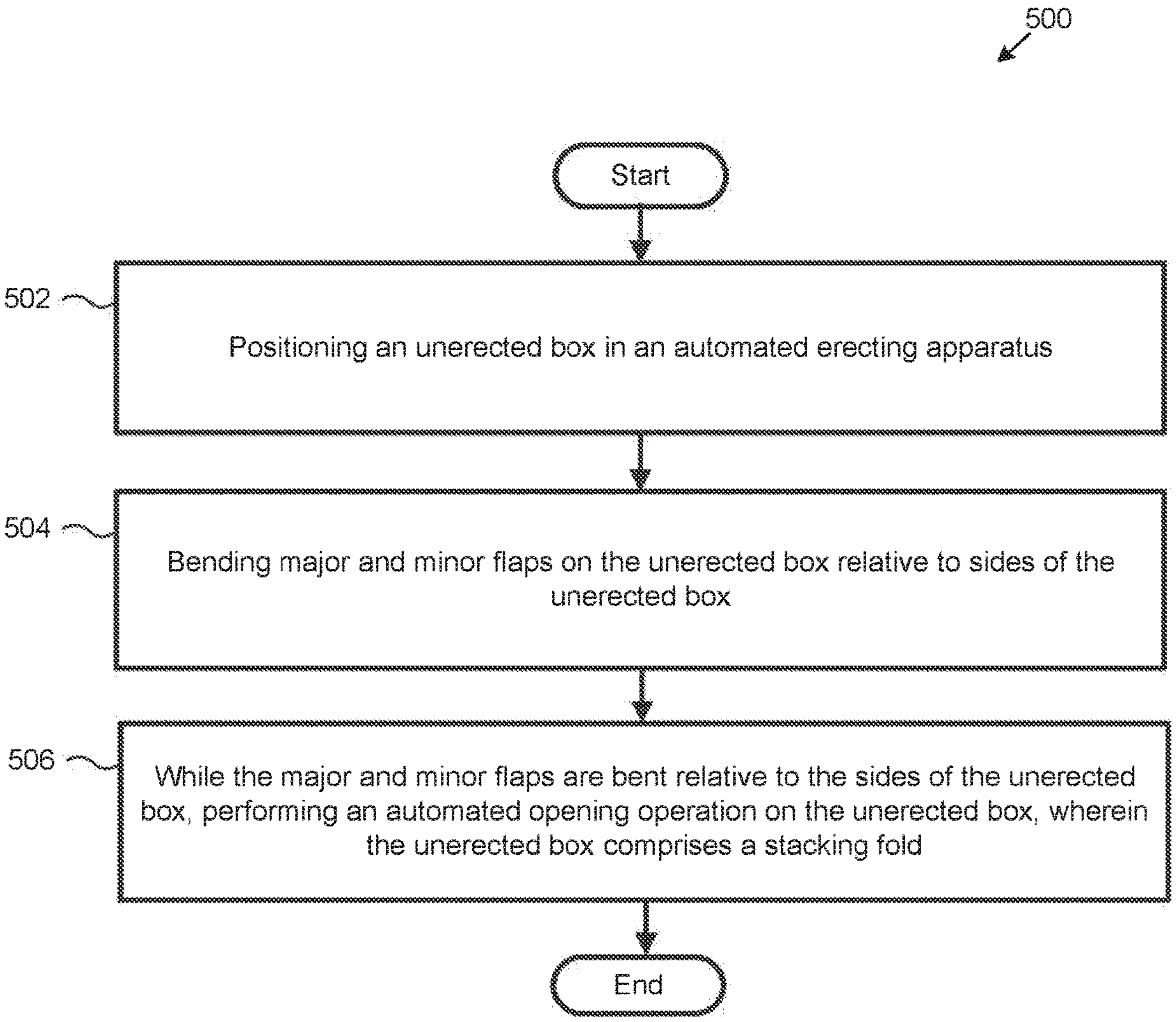
FIG. 16 is a schematic flow diagram of a method in accordance with one embodiment of the subject matter disclosed herein.

Now referring to FIG. 16, one embodiment of a method 500 is shown. The method 500 includes positioning an unerected box in an automated erecting apparatus at 502. At 504, the method 500 includes bending major and minor flaps on the unerected box relative to sides of the unerected box. The method further includes, while the major and minor flaps are bent relative to the sides of the unerected box, performing an automated opening operation on the unerected box at 506, wherein the unerected box includes a stacking fold. The method then ends.

In some embodiments, bending the major and minor flaps on the box includes bending a first set of flaps in a first direction and bending a second set of flaps in a second direction.

In some embodiments, the first direction is opposite the second direction. For example, two of the flaps are bent upwards and the other two flaps are bent downwards.

In some embodiments, the method further includes indexing the unerected box in a starting position within the automated erecting apparatus, wherein the unerected box is positioned on a table with the major and minor flaps overhanging a table edge.

In some embodiments, the stacking fold is located on at least one side of the unerected box.

In some embodiments, the unerected box includes four sides, wherein a first set of two sides are coplanar and a second set of two sides are coplanar, wherein the four sides are parallel to each other.

In some embodiments, the unerected box includes four corner creases, wherein the corner creases are positioned between two respective sides of the unerected box.

In some embodiments, the stacking fold is located on one of the four sides separate from the corner creases.

In some embodiments, the bending the plurality of major and minor flaps on the box includes bending a first major flap and a first minor flap in a first direction, wherein bending the plurality of major and minor flaps on the box further includes bending a second major flap and a second minor flap in a second direction.

In some embodiments, the automated opening operation includes suctioning at least one side of the unerected box and rotating one side of the unerected box relative to another side of the unerected box to form an erected box.

In some embodiments, each of the four sides of the erected box is orthogonal to respective adjacent sides of the erected box.

In some embodiments, the method further includes performing automated folding operations to fold the major and minor flaps such that the major and minor flaps are orthogonal to the sides of the erected box.

In some embodiments, the method further includes reinforcing the stacking fold by bending the major and minor flaps relative to the sides of the unerected box.

In some embodiments, the unerected box includes more than one stacking fold located on one of the four sides separate from the corner creases.

Although described in a depicted order, the method may proceed in any of a number of ordered combinations.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item Band item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The subject matter disclosed herein may be embodied in other specific forms without departing from its spirit or essential characteristics. The described embodiments are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

We claim:

1. A system for erecting a box from an unerected box, the system comprising:

an automated erecting apparatus comprising:

a first folding arm configured to move in a direction that is generally perpendicular to a major surface of a sidewall of the unerected box to bend a first major flap and a first minor flap of the unerected box in a first direction;

a second folding arm configured to move in a direction that is generally perpendicular to the major surface of the sidewall of the unerected box to bend a second major flap and a second minor flap of the unerected box in a second direction; and a suction panel configured to erect the unerected box while the first major flap, the second major flap, the first minor flap, and the second minor flap are bent, wherein bending the first major flap and the first minor flap or bending the second major flap and the second minor flaps is configured to limit or prevent the unerected box from bending or folding at a stacking fold in the unerected box.

2. The system according to claim 1, wherein the first direction is opposite the second direction.

3. The system according to claim 1, wherein the unerected box comprises four sidewalls, wherein a first set of two sidewalls are coplanar and a second set of two sidewalls are coplanar, wherein the four sidewalls are parallel to each other.

4. The system according to claim 3, wherein the unerected box comprises four corner creases, wherein the corner creases are positioned between two respective sidewalls of the unerected box.

5. The system according to claim 4, wherein the stacking fold is located on one of the four sidewalls separate from the corner creases.

6. The system according to claim 4, wherein the unerected box comprises more than one stacking fold located on one of the four sidewalls separate from the four corner creases.

7. The system according to claim 3, further comprising a restraining bar, the restraining bar being configured to engage the unerected box on one or more of the sidewalls adjacent to the first major flap, the first minor flap, the second major flap, or the second minor flap and while the flaps are being bent.

8. The system according to claim 3, further comprising a support surface having an edge, the support surface being configured to support the sidewalls of the unerected box and have the first major flap, the first minor flap, the second major flap, and the second minor flap extend beyond the edge of the support surface.

9. The system according to claim 3, wherein one or both of the first folding arm and second folding arms are selectively movable in a direction parallel to the major surface of the sidewall and towards the sidewalls of the unerected box to fold the first major flap, the first minor flap, the second major flap, or the second minor flap to a ninety degree angle relative to the sides of the unerected box to form at least a portion of a closed bottom surface of the box.

10. An automated erecting apparatus for erecting a box from an unerected box, the unerected box having a plurality of sidewalls, a plurality of bottom flaps extending from the plurality of sidewalls, and a plurality of creases formed between the plurality of sidewalls and the plurality of bottom flaps, the apparatus comprising:

a support surface having an edge, the support surface being configured to support the plurality of sidewalls of the unerected box and have the plurality of creases generally aligned with the edge of the support surface such that the plurality of bottom flaps extend beyond the edge of the support surface;

a restraining bar configured to selectively move towards the unerected box to engage one or more panels of the plurality of sidewalls of the unerected box to secure the unerected box against the support surface and selectively move away from the unerected box to disengage the one or more panels;

a folding arm configured to move in a direction that is generally perpendicular to a major surface of one of the sidewalls of the unerected box to bend at least one bottom flap of the plurality of bottom flaps relative to an associated sidewall; and an erector element configured to erect the unerected box while the at least one bottom flap is bent, wherein bending the at least one bottom flap is configured to limit or prevent the unerected box from bending or folding at a stacking fold in the unerected box.

11. The automated erecting apparatus according to claim 10, further comprising a second folding arm configured to bend at least a second bottom flap of the plurality of bottom flaps relative to the associated sidewalls.

12. The automated erecting apparatus according to claim 11, wherein the folding arm is configured to bend the at least one bottom flap in a first direction and the second folding arm is configured to bend the second bottom flap in a second direction that is opposite to the first direction.

13. The automated erecting apparatus according to claim 10, wherein the erector element comprises a suction panel.

14. The automated erecting apparatus according to claim 13, wherein the suction panel is configured to suction to one panel of the plurality of sidewalls.

15. The automated erecting apparatus according to claim 14, wherein the suction panel is configured to pivot from a closed position to an open position while suctioning to the one panel of the plurality of sidewalls.

16. The automated erecting apparatus according to claim 15, wherein the restraining bar is configured to disengage the one or more panels of the plurality of sidewalls before the suction panel is pivoted to the open position.

17. An automated erecting apparatus for erecting a box from an unerected box, the unerected box having a plurality of sidewalls, a plurality of bottom flaps extending from the plurality of sidewalls, and a plurality of creases formed between the plurality of sidewalls and the plurality of bottom flaps, the apparatus comprising:

a support surface having an edge, the support surface being configured to support the plurality of sidewalls of the unerected box and have the plurality of creases generally aligned with the edge of the support surface such that the plurality of bottom flaps extend beyond the edge of the support surface;

a restraining element configured to engage one or more panels of the plurality of sidewalls of the unerected box to secure the unerected box against the support surface;

a first folding arm configured to move in a first direction to partially bend a first bottom flap of the plurality of bottom flaps relative to an associated sidewall, the first folding arm being configured to move in a second, lateral direction to fold the first bottom flap to a ninety degree angle relative to the plurality of sidewalls of the unerected box, the second, lateral direction being generally perpendicular to the first direction;

a second folding arm configured to move in a second direction to bend a second bottom flap of the plurality of bottom flaps relative to an associated sidewall; and an erector element configured to erect the unerected box while the first bottom flap or second bottom flap is bent, wherein bending the first bottom flap or the second bottom flap is configured to limit or prevent the unerected box from bending or folding at a stacking fold in the unerected box.

18. The automated erecting apparatus according to claim 17, wherein the restraining element is configured to selectively move into engagement with the one or more panels and selectively move out of engagement with the one or more panels.

19. The automated erecting apparatus according to claim 17, wherein the second folding arm is configured to move in a second, lateral direction to fold the second bottom flap to a ninety degree angle relative to the plurality of sidewalls of the unerected box, the second, lateral direction being generally perpendicular to the second direction.

20. The automated erecting apparatus according to claim 17, wherein the erector element comprises suction panel that is configured to selectively suction to one of the plurality of sidewalls and pivot to an open configuration.

* * * * *